US011044321B2

(12) United States Patent
Bao

(10) Patent No.: US 11,044,321 B2
(45) Date of Patent: *Jun. 22, 2021

(54) SPEECH PROCESSING PERFORMED WITH RESPECT TO FIRST AND SECOND USER PROFILES IN A DIALOG SESSION

(71) Applicant: Amazon Technologies, Inc., Seattle, WA (US)

(72) Inventor: Yu Bao, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/735,099

(22) Filed: Jan. 6, 2020

(65) Prior Publication Data

US 2020/0220935 A1 Jul. 9, 2020

Related U.S. Application Data

(63) Continuation of application No. 15/794,315, filed on Oct. 26, 2017, now Pat. No. 10,567,515.

(51) Int. Cl.
*G10L 15/22* (2006.01)
*G10L 17/22* (2013.01)
(Continued)

(52) U.S. Cl.
CPC .............. *H04L 67/14* (2013.01); *G06F 3/167* (2013.01); *G10L 15/22* (2013.01); *G10L 17/22* (2013.01);
(Continued)

(58) Field of Classification Search
CPC ......... G10L 15/22; G10L 17/00; G10L 17/22; H04L 67/14; H04L 67/60; H04L 67/306
(Continued)

(56) References Cited

U.S. PATENT DOCUMENTS 8,234,494 B1 * 7/2012 Bansal .................... G10L 15/02
713/176
8,990,077 B2 * 3/2015 Mallett ................... G10L 17/00
704/231
(Continued)

*Primary Examiner* — Martin Lerner
(74) *Attorney, Agent, or Firm* — Pierce Atwood LLP

(57) ABSTRACT

Techniques for implementing a "volatile" user ID are described. A system receives first input audio data and determines first speech processing results therefrom. The system also determines a first user that spoke an utterance represented in the first input audio data. The system establishes a multi-turn dialog session with a first content source and receives first output data from the first content source based on the first speech processing results and the first user. The system causes a device to present first output content associated with the first output data. The system then receives second input audio data and determines second speech processing results therefrom. The system also determines the second input audio data corresponds to the same multi-turn dialog session. The system determines a second user that spoke an utterance represented in the second input audio data and receives second output data from the first content source based on the second speech processing results and the second user. The system causes the device to present second output content associated with the second output data.

20 Claims, 23 Drawing Sheets

(51) Int. Cl.
  *H04L 29/08* (2006.01)
  *G06F 3/16* (2006.01)
  *G10L 15/26* (2006.01)
(52) U.S. Cl.
  CPC ............ *H04L 67/306* (2013.01); *G10L 15/26* (2013.01); *G10L 2015/223* (2013.01)
(58) Field of Classification Search
  USPC .................................. 704/246, 249, 273, 275
  See application file for complete search history.

(56) References Cited

U.S. PATENT DOCUMENTS

| | | | | |
|---|---|---|---|---|
| 9,318,104 | B1 * | 4/2016 | Fructuoso | G10L 15/28 |
| 9,384,734 | B1 * | 7/2016 | Wiseman | G10L 15/26 |
| 10,032,451 | B1 * | 7/2018 | Mamkina | G10L 15/18 |
| 10,146,923 | B2 * | 12/2018 | Pitkanen | G10L 17/22 |
| 10,276,064 | B2 * | 4/2019 | Wohlert | G10L 21/0364 |
| 10,304,463 | B2 * | 5/2019 | Mixter | G10L 17/04 |
| 10,332,517 | B1 * | 6/2019 | Wang | G10L 15/22 |
| 10,395,655 | B1 * | 8/2019 | Kumar | G10L 15/22 |
| 10,438,594 | B2 * | 10/2019 | Miller | G10L 17/22 |
| 10,490,195 | B1 * | 11/2019 | Krishnamoorthy | G10L 17/22 |
| 10,567,515 | B1 * | 2/2020 | Bao | G10L 17/22 |
| 10,622,006 | B2 * | 4/2020 | Jalali | G10L 17/00 |
| 10,715,604 | B1 * | 7/2020 | Bao | G10L 17/22 |
| 10,755,709 | B1 * | 8/2020 | Mamkina | G10L 15/22 |
| 2002/0065912 | A1 * | 5/2002 | Catchpole | H04L 67/14 709/224 |
| 2012/0084087 | A1 * | 4/2012 | Yang | G10L 17/00 704/246 |
| 2013/0132091 | A1 * | 5/2013 | Skerpac | G10L 17/24 704/273 |
| 2014/0236598 | A1 * | 8/2014 | Fructuoso | G10L 15/28 704/249 |
| 2016/0342389 | A1 * | 11/2016 | Weinstein | G06F 40/109 |
| 2017/0140761 | A1 * | 5/2017 | Secker-Walker | G10L 17/22 |
| 2018/0007210 | A1 * | 1/2018 | Todasco | G10L 15/22 |
| 2018/0182396 | A1 * | 6/2018 | An | G10L 15/08 |
| 2020/0273477 | A1 * | 8/2020 | Kwatra | G10L 17/00 |
| 2020/0301660 | A1 * | 9/2020 | Kelly | G06F 3/167 |

* cited by examiner

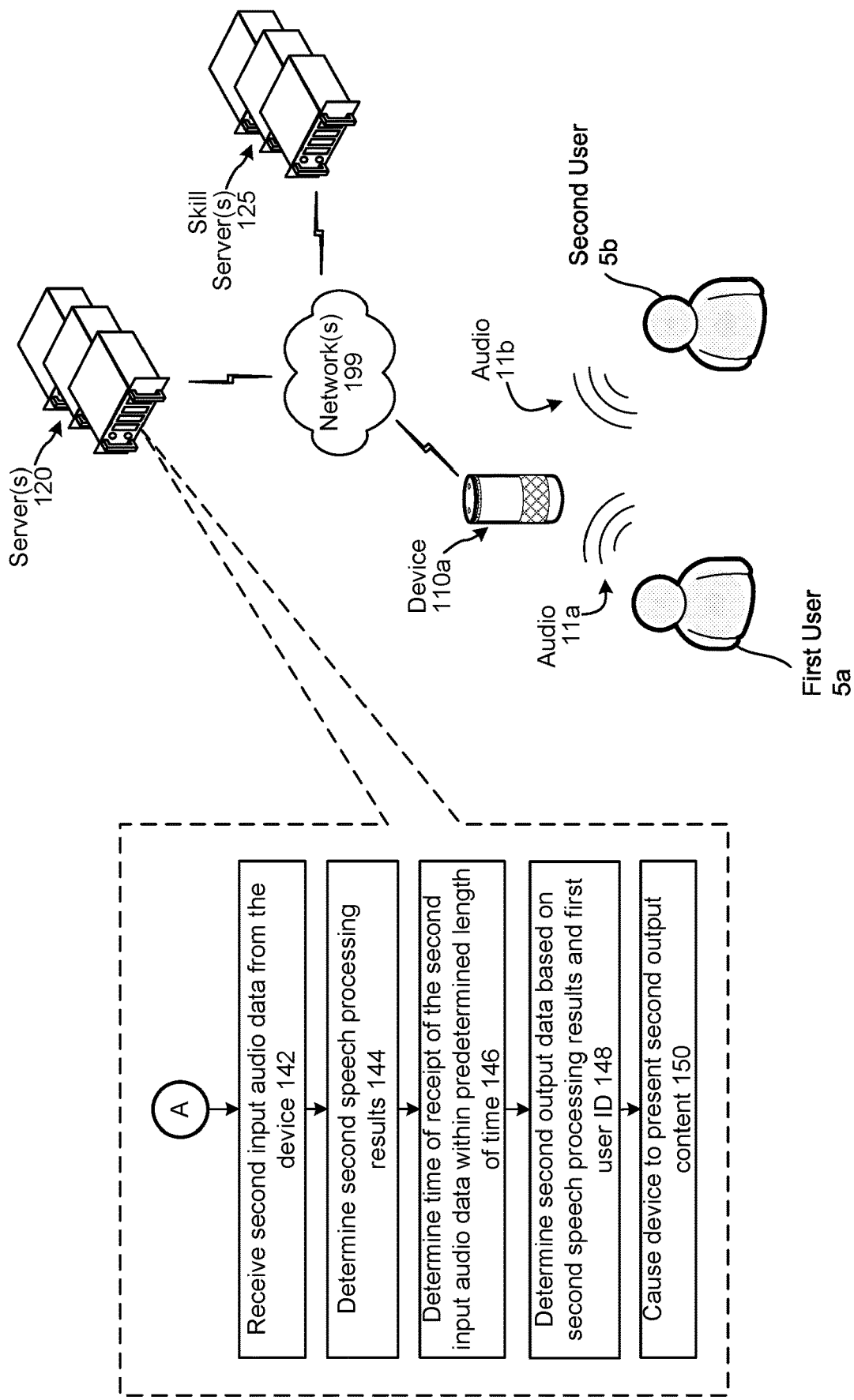

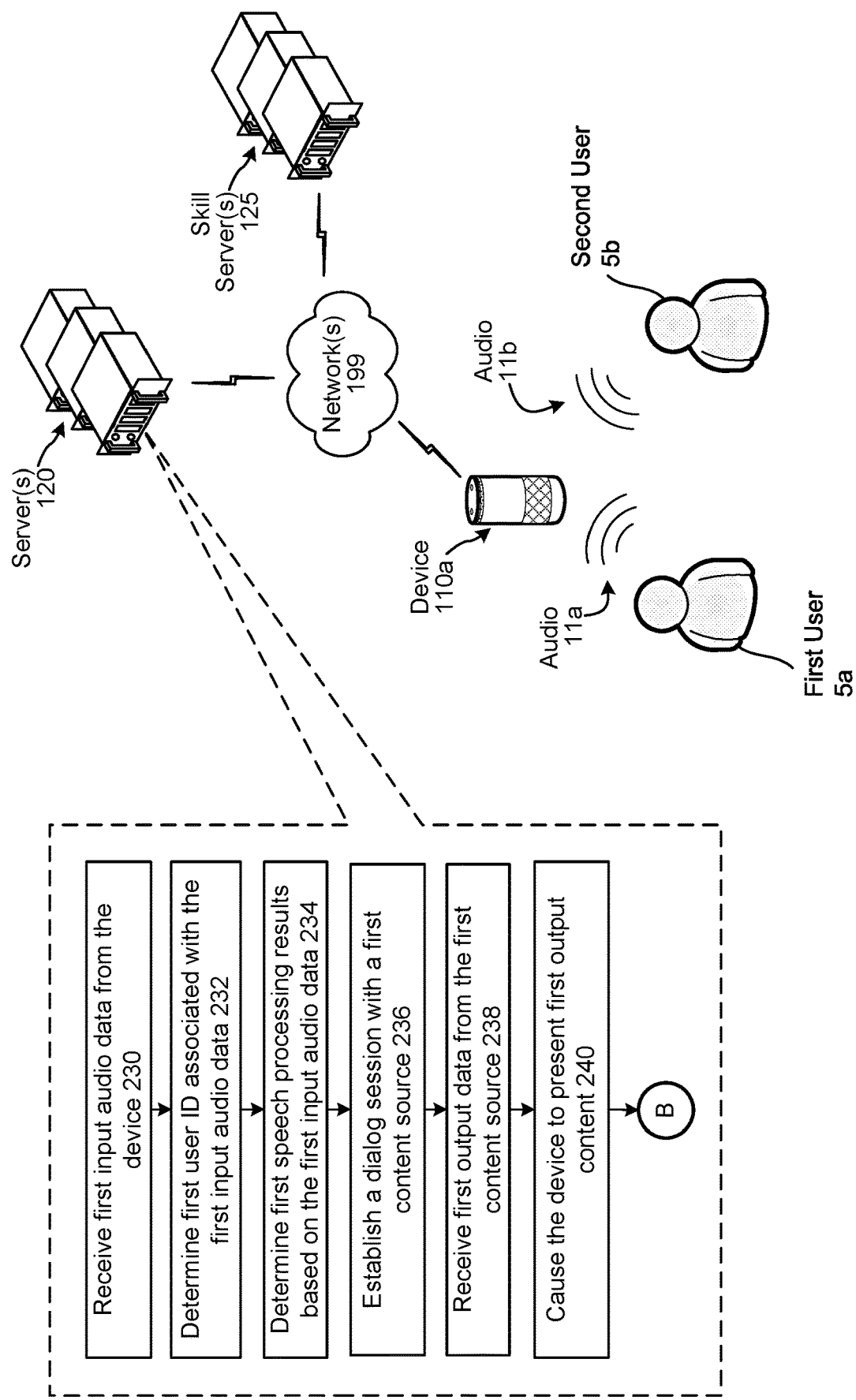

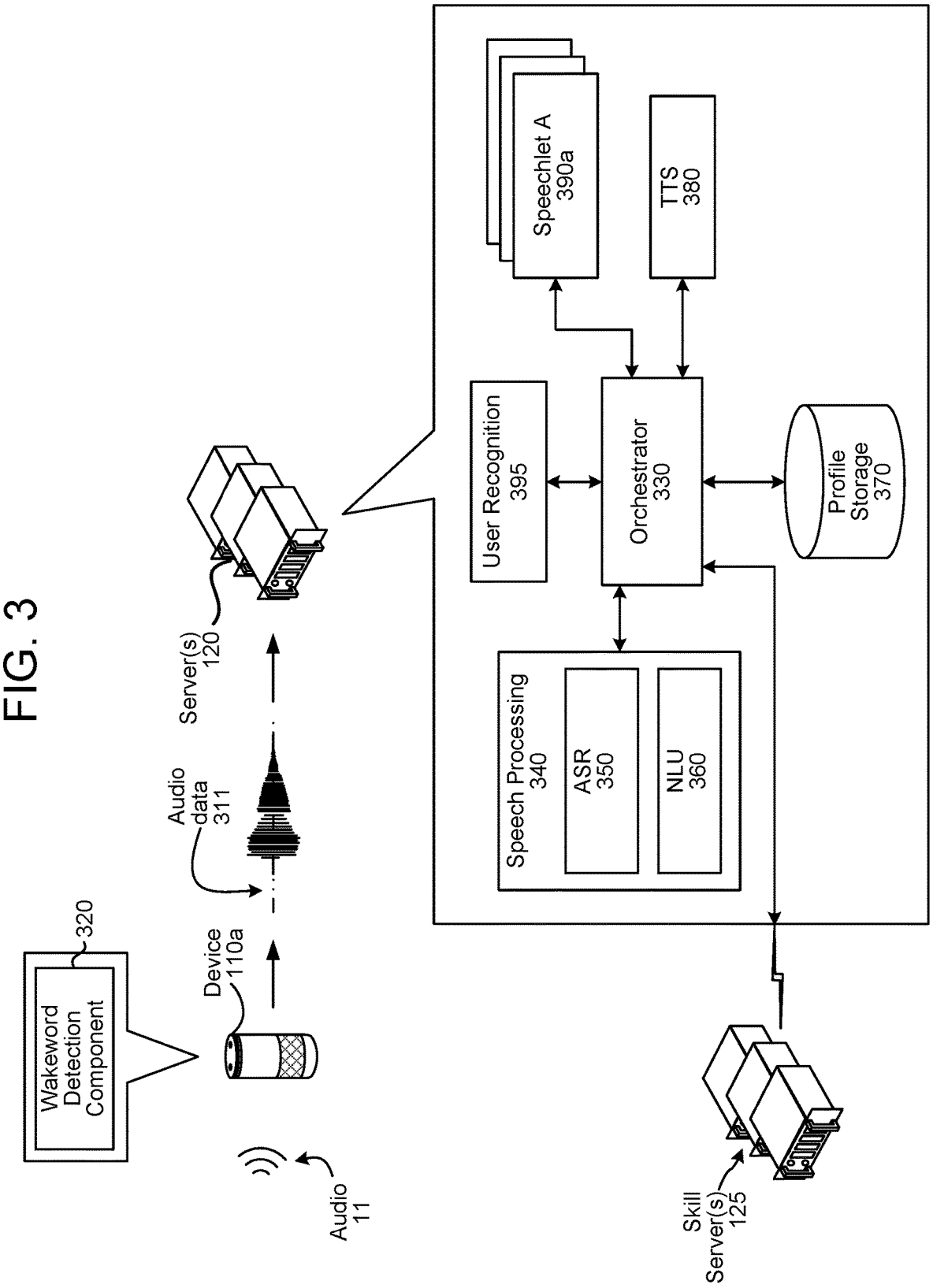

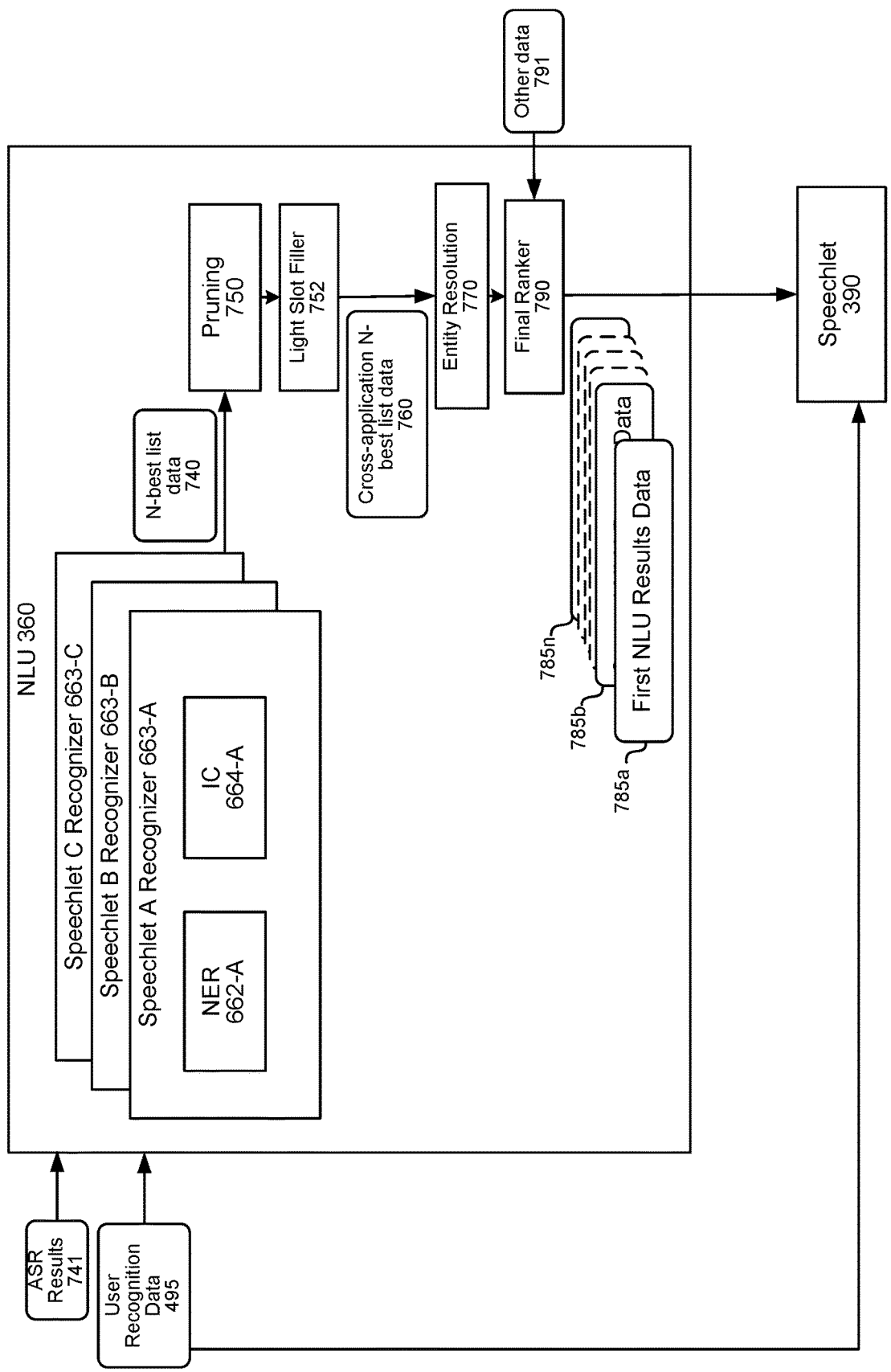

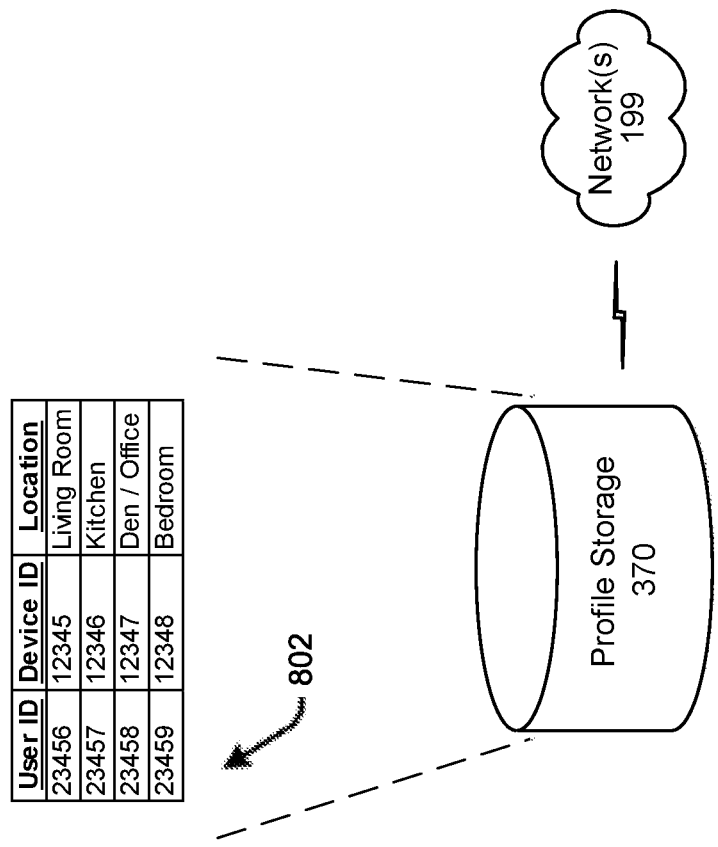

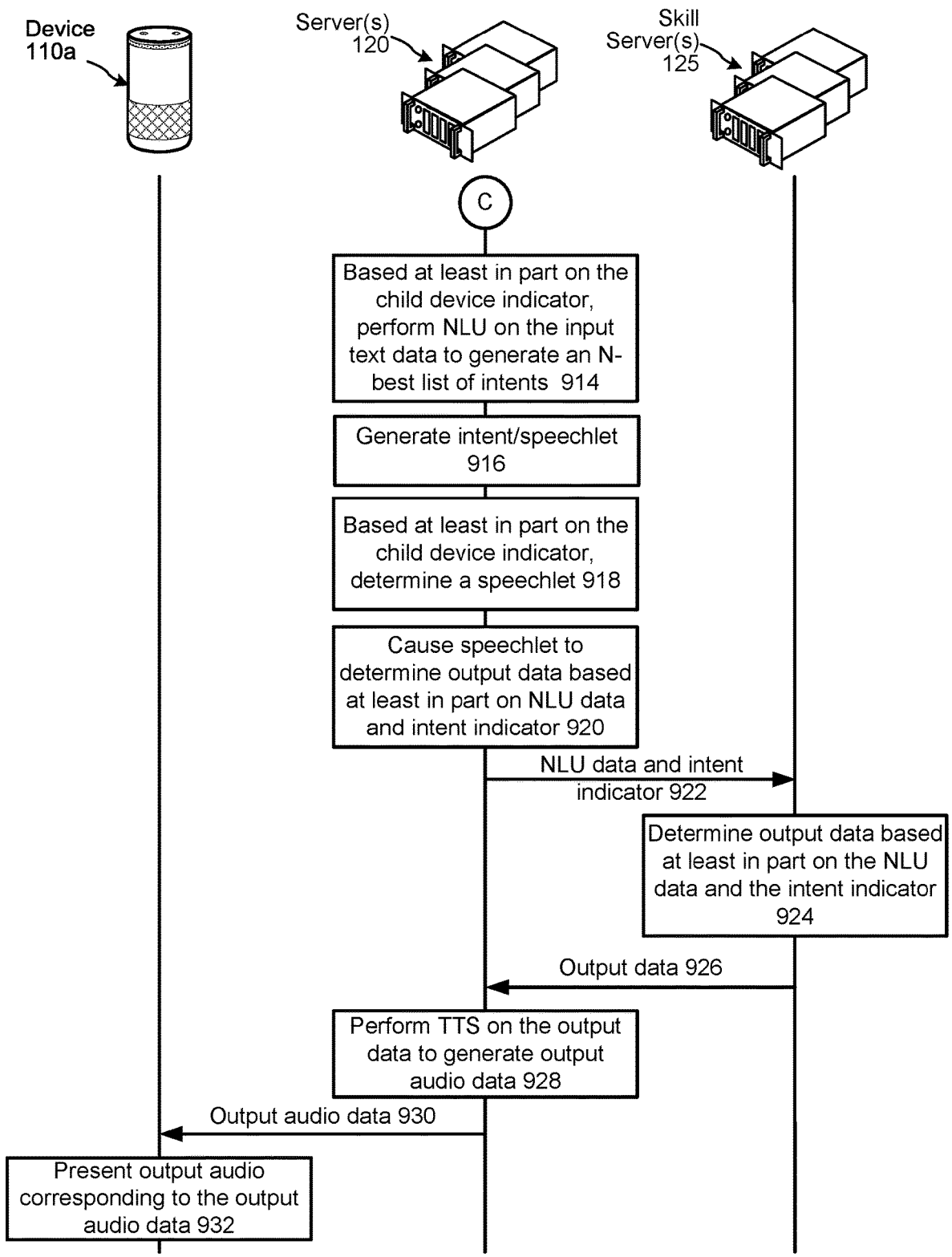

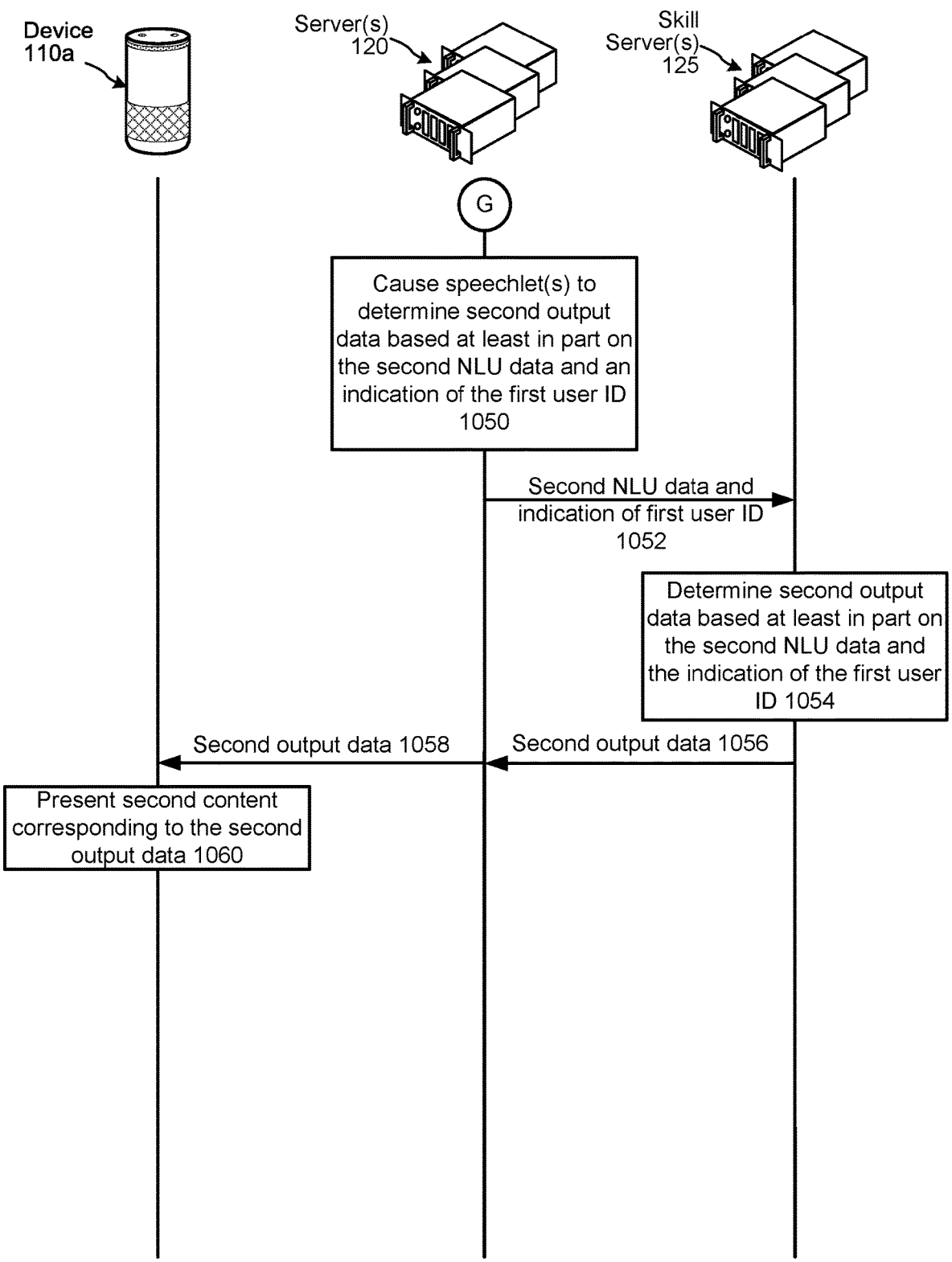

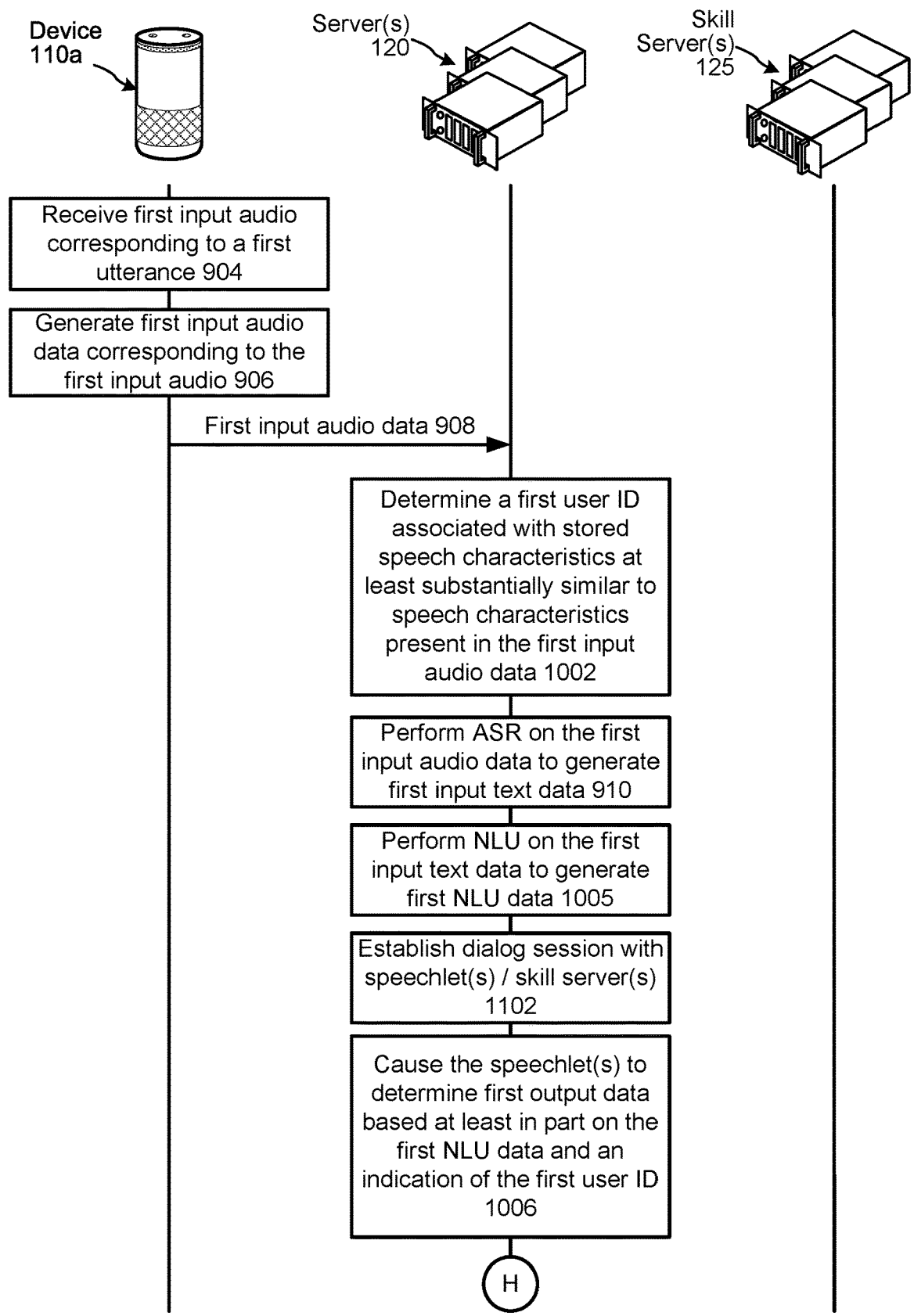

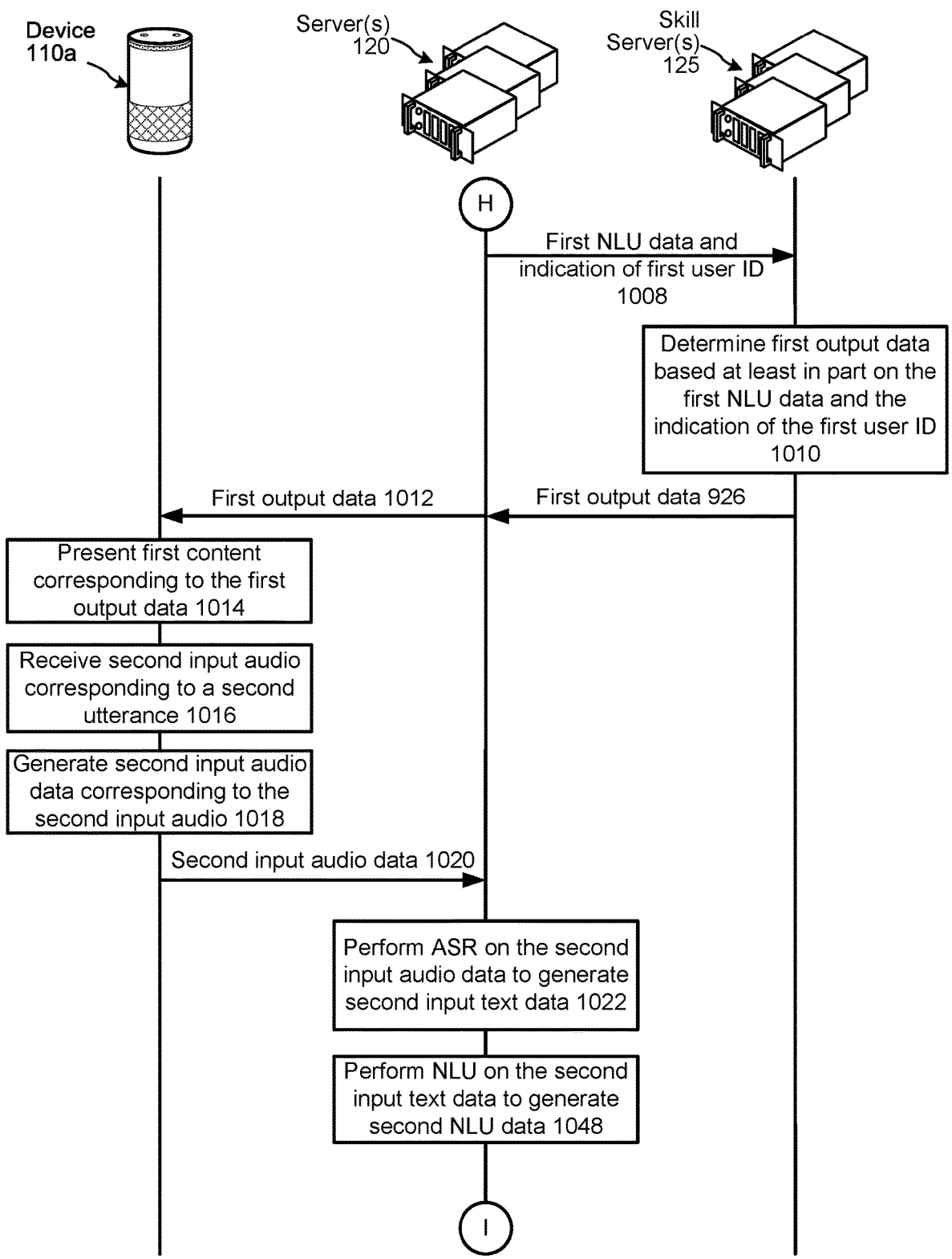

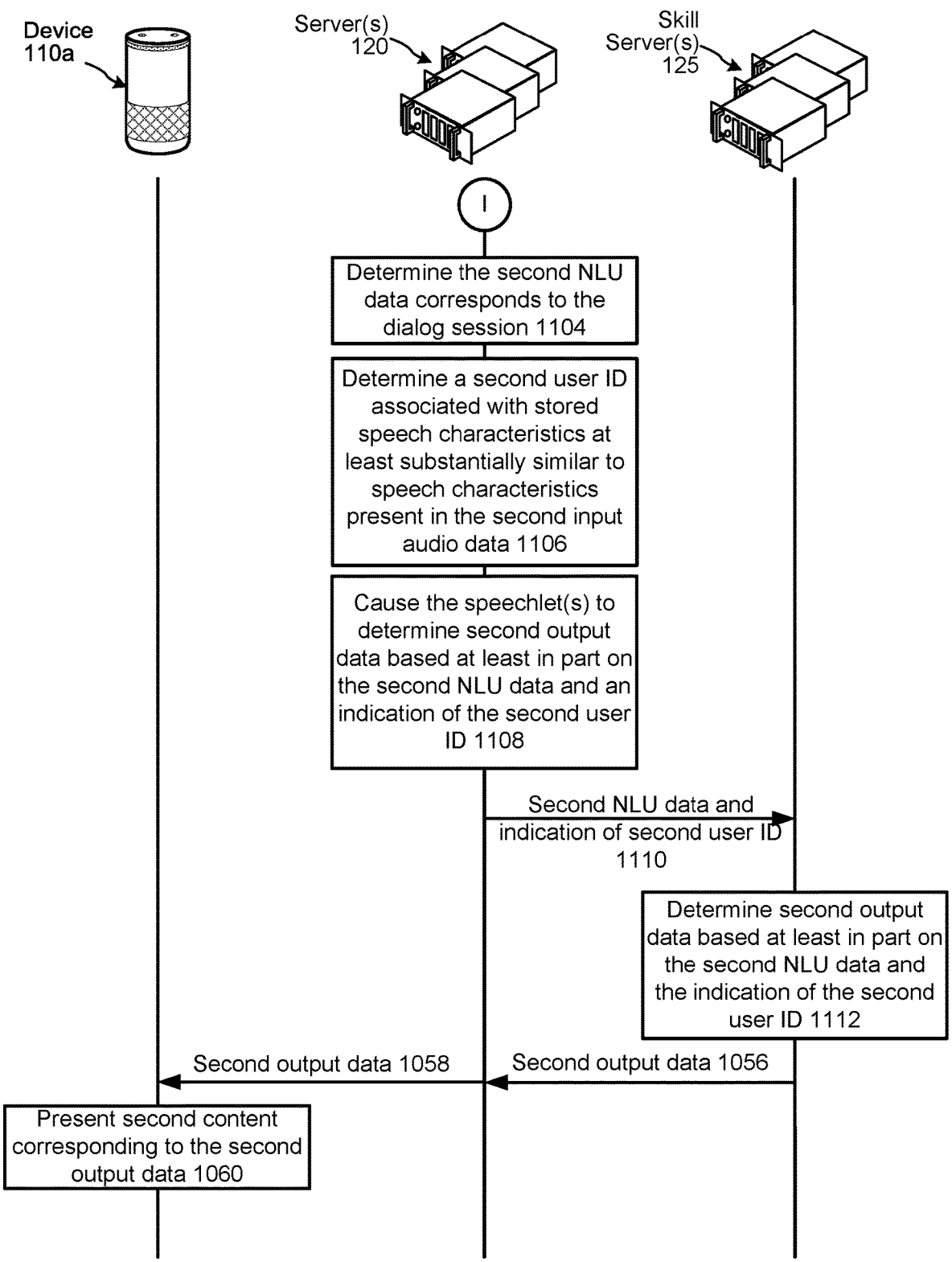

SPEECH PROCESSING PERFORMED WITH RESPECT TO FIRST AND SECOND USER PROFILES IN A DIALOG SESSION

CROSS-REFERENCE TO RELATED APPLICATION DATA

This application is a continuation of, and claims the benefit of priority of, U.S. Pat. No. 10,567,515, entitled "SPEECH PROCESSING PERFORMED WITH RESPECT TO FIRST AND SECOND USER PROFILES IN A DIALOG SESSION," issued on Feb. 18, 2020, which is incorporated herein by reference in its entirety.

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of automatic speech recognition processing and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 1A and 1B illustrate a system configured to process data with respect to multiple different dialog sessions using a single user identifier according to embodiments of the present disclosure.

FIGS. 2A and 2B illustrate a system configured to process data with respect to a single multi-turn dialog session using multiple user identifiers according to embodiments of the present disclosure.

FIG. 3 is a conceptual diagram of components of a system according to embodiments of the present disclosure.

FIG. 7 is a conceptual diagram of how natural language processing is performed according to embodiments of the present disclosure.

FIG. 8 illustrates data stored and associated with profiles according to embodiments of the present disclosure.

FIGS. 9A and 9B are a signal flow diagram illustrating the authentication of a child mode device and the processing of a child mode device command according to embodiments of the present disclosure.

FIGS. 10A through 10E are a signal flow diagram illustrating the use of a previous user ID with respect to processing of a current command according to embodiments of the present disclosure.

FIGS. 11A through 11C are a signal flow diagram illustrating the use of multiple user IDs with respect to processing of a single dialog session according to embodiments of the present disclosure.

DETAILED DESCRIPTION

Figure 1A:
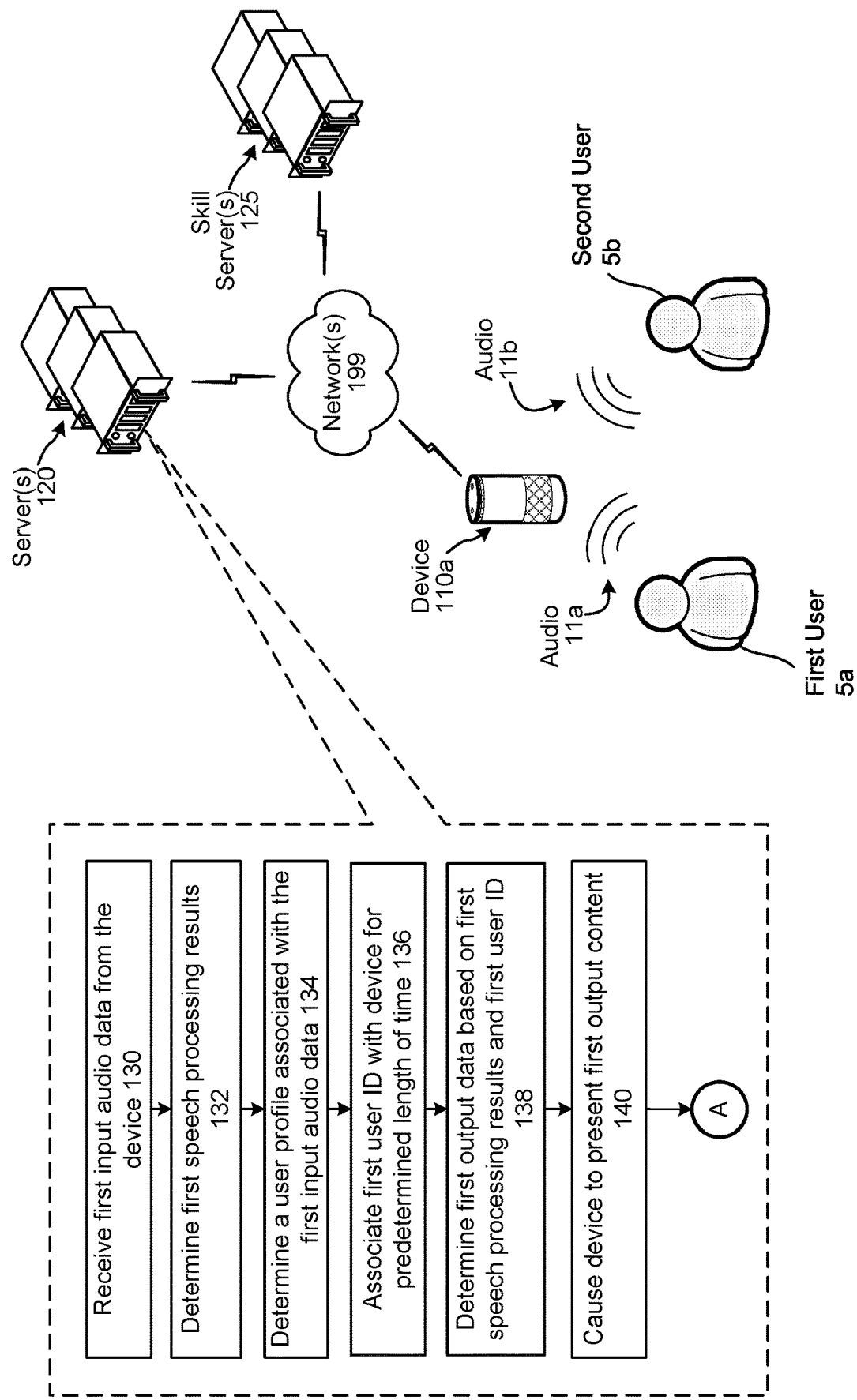

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. The combination of ASR and NLU may be referred to herein as speech processing.

A speech processing system enables users to interact with system devices using speech in order to cause the system to perform actions. For example, a user may say "Alexa, play my pop music playlist." In response, a device of the system may identify the user, identify the user's "pop music playlist," and then play music from the user's pop music playlist.

A speech processing system may be configured with the ability to perform a wide variety of different functions as executed by skills and/or speechlets, as described below. Each different skill/speechlet may enable the system to perform one or more actions. For example, a music steaming skill may enable the system to output a user's playlist, a pizza restaurant's skill may enable the system to order a pizza on a user's behalf, a ride sharing service's skill may enable the system to book a ride sharing trip on a user's behalf, and so on. The system's server(s) may perform certain operations (such as ASR and NLU) while a skill's server(s) may perform other operations such as sending an order to the appropriate fulfillment location, etc.

It may be desirable for the system to limit operation of skills and/or speechlets depending on the identity of the user. For example, the system may be configured with a smart home skill that enables users to control household devices such as door locks. The system may be configured such that the smart home skill may only lock and unlock doors for authorized users. In an example of such limited operation, the system may be configured to allow certain operations to be initiated by adults, while limiting operations that can be initiated by children (e.g., those under the age of eighteen or some other configurable age threshold).

Some user recognition techniques attempt to determine an identity of a user based on characteristics of the user's speech. For example, an adult user may say "Alexa, play my top hits playlist." The system may process the audio data of the utterance to determine the type of the user (e.g., an adult or a child). The system may alternatively process the audio data to determine an identity of the user and, based on the user's identity, determine the type of the user.

Certain user recognition techniques (e.g., using speech characteristics of an utterance) are not always successful when the user is a child. A child's vocabulary is usually more limited than an adult's and, thus, a child's speech may be terser than an adult's. Because of this, a child's speech may not have enough speech characteristics for the system to confidently identify the user. For example, whereas the adult user may say "Alexa, open the front door of the house," a child user may say "Alexa, open door." Moreover, whereas "Alexa, open the front door of the house" may include a sufficient amount of speech characteristics to identify the user, "Alexa, open door" may have an insufficient amount of speech characteristics for purposes of user recognition. Without knowing the identity of the user, the system may be prevented from executing the user's intent (e.g., unlocking a door that can only be unlocked by an authorized user) and/or may execute the user's intent when the system should refrain from such (e.g., unlocking a door when the user is a child).

To address this and other issues, a system according to the present disclosure may associate the serial number of a device with a user profile indicating the user is a child. This enables the system to confidently determine the user is a child even if the user's speech has insufficient speech characteristics to make a separate determination as to the user's identity and type.

Some system skills may need to know the user's identity in order for the skill to work. For example, a first user may say "Alexa, play my top hits music." In response, the system may determine an identity and/or type of the first user (e.g., based on the user's speech or other user recognition technique, and/or if the serial number is associated with a particular user) and may output the user's top hits playlist. In this example, the first user may be a child. Thereafter, a second user may say "Alexa, unlock the front door." The system may attempt to determine the identity and/or type of the second user, but may be unsuccessful. The system may assume second unidentified user is the previous identified first user for executing commands with respect to various speechlets/skills. For example, according to the aforementioned example, the system may treat the request to play the top hits music and the request to unlock the front door as originating from the first user. According to the above, when the system is unable to determine the identity and/or type of the second user, the system can determine the identity and/or type of the first user and use that identity and/or type as the identity and/or type for the second user. Since the first user in the aforementioned example was a child, the system would determine the second user is a child and refrain from unlocking the front door in response to the second user's command.

FIGS. 1A and 1B illustrate a system configured to process data with respect to multiple different dialog sessions using a single user identifier (ID). As illustrated in FIGS. 1A and 1B, a device 110a local to user (e.g., a first user 5a and a second user 5b), one or more servers 120, and one or more skill servers 125 may be connected across one or more networks 199. The device 110a may capture audio 11a corresponding to speech of the first user 5a. The device 110a generates first input audio data corresponding to the audio 11a and sends the first input audio data to the server(s) 120.

The server(s) 120 receives (130) the first input audio data. The audio 11a may include a wakeword followed by a command. When the server(s) 120 receives the first input audio data corresponding to the audio 11a, the server(s) 120 may establish a first dialog session.

A "dialog" or "dialog session" as used herein may refer to data transmissions between the server(s) 120 and a local device (e.g., the device 110a) that all relate to a single originating command. Thus, the data transmissions of a dialog session may share a dialog ID or other unique identifier that may be used by an orchestrator component, speechlet, etc. to track information across the dialog session. For example, the device 110a may send the server(s) 120 input audio data corresponding to "Alexa, play jeopardy." The server(s) 120 may send output audio data corresponding to a jeopardy statement to the device 110a for output to a user(s). A user may then speak an answer to the statement, which the device 110a sends as input audio data to the server(s) 120. The sending of audio data from the device 110a to the server(s) 120, the sending of output audio data from the server(s) 120 to the device 110a, and the sending of subsequent input audio data from the device 110a to the server(s) 120 may all correspond to a single dialog session related to the originating command "play jeopardy." In some examples, a dialog-initiating utterance may start with a wakeword and end with a command, such as "Alexa, play jeopardy," where "Alexa" is the wakeword and "play jeopardy" is the command. Subsequent utterances of the same dialog session may or may not start with speaking of a wakeword. Each utterance of a session may be associated with a unique utterance ID such that multiple utterance IDs may be associated with a single dialog session ID.

The server(s) 120 determines (132) first speech processing results. For example, the server(s) 120 may perform ASR on the first input audio data to generate first input text data and may perform NLU on the first input text data to generate the first speech processing results.

The server(s) 120 also determines (134) a user profile associated with the first input audio data. For example, the server(s) 120 may perform user recognition processing (as detailed herein) to determine speech characteristics of the first input audio data and may determine the speech characteristics corresponding to stored speech characteristics associated with a user profile. The user profile may be associated with a first user identifier (ID).

The server(s) 120 may associate (136) the first user ID with the device 110a (namely the device's device ID) for a predetermined length of time. If the first user ID corresponds to a child user, associating the first user ID with the device 110a may cause the system to execute commands received from the device 110a in the predetermined period of time as being spoken by a child user.

The server(s) 120 determines (138) first output data based on the speech processing results and the first user ID. The server(s) 120 then causes (140) the device 110a to present first output content associated with the first output data. Sending of the first output data from the server(s) 120 to the device 110a may end the first dialog session.

While or after the device 110a presents the first content, the device 110a may capture audio 11b corresponding to speech of the second user 5b. The device 110a generates second input audio data corresponding to the audio 11b and sends the second input audio data to the server(s) 120.

The server(s) receives (142) the second input audio data. The audio 11b may include a wakeword followed by a command. When the server(s) 120 receives the second input audio data corresponding to the audio 11b, the server(s) 120 may establish a second dialog session, different from the first dialog session.

The server(s) 120 determines (144) second speech processing results. For example, the server(s) 120 may perform ASR on the second input audio data to generate second input text data and may perform NLU on the second input text data to generate the second speech processing results. The server(s) 120 also determines (146) a time of receipt of the second input audio data is within the predetermined length of time that the first user ID is associated with the device 110a.

The server(s) 120 may then determine (148) second output data based on the second speech processing results and the first user ID. The server(s) 120 then causes (150) the device 110a to present second output content corresponding to the second output data. Sending of the second output data from the server(s) 120 to the device 110a may end the second dialog session.

A system may engage a user is a multi-turn dialog wherein a user speaks something to the system and the system provides the user with content from a speechlet. This process is repeated such that the user then speaks something to the system that is responsive to the previous output content and the system thereafter provides the user with additional content from the same speechlet.

Certain systems may assume a single user engages with the system in a multi-turn dialog even though multiple users may be engaging the system. For example, when a user speaks something to that system that initiates a multi-turn dialog, the system may determine a first user that spoke and the output content may be tailored to the first user. Thereafter, a second user may speak something to the system that is part of the same dialog. The system may assume the first user subsequently spoke to the system and output subsequent content that is tailored to the first user, even though the subsequent content would ideally be tailored to the second user. The present disclosure improves upon the aforementioned systems by determining the user that spoke at each iteration of a multi-turn dialog involving a single speechlet.

Figure 2B:
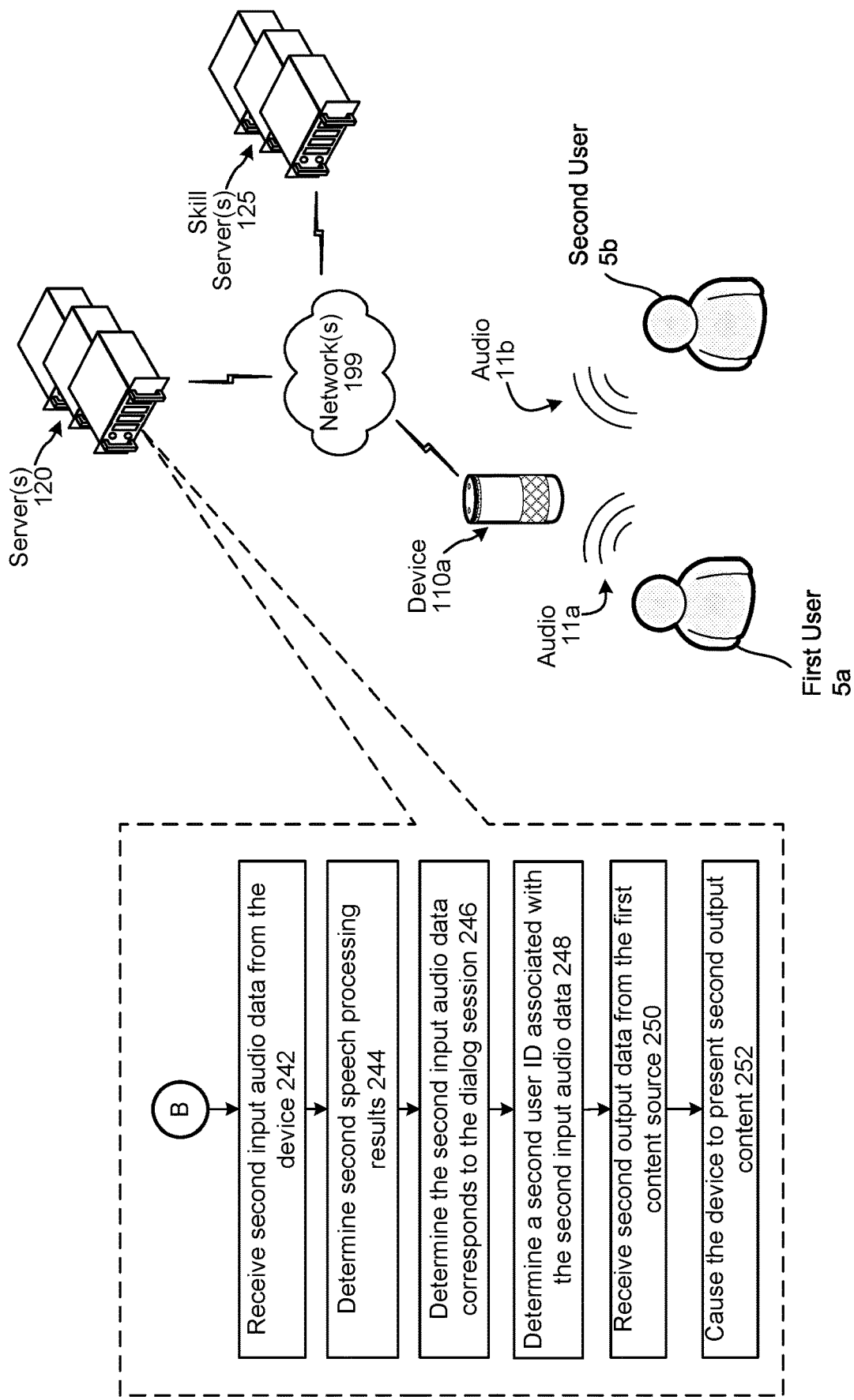

FIGS. 2A and 2B illustrate a system configured to process data with respect to a single multi-turn dialog session using multiple user IDs. The device 110a may capture audio 11a corresponding to speech of the first user 5a. The device 110a generates first input audio data corresponding to the audio 11a and sends the first input audio data to the server(s) 120.

The server(s) 120 receives (230) the first input audio data. The audio 11a may include a wakeword followed by a command. When the server(s) 120 receives the first input audio data corresponding to the audio 11a, the server(s) 120 may establish a first dialog session.

The server(s) 120 determines (232) a first user ID associated with the first input audio data. For example, the server(s) 120 may use one or more user recognition processes described herein to determine the first user 5a spoke the audio 11a as well as determine the first user ID is associated with a first user profile associated with the first user 5a.

The server(s) 120 determines (234) first speech processing results based on the first input audio data. For example, the server(s) 120 may perform ASR on the first input audio data to generate first input text data and may perform NLU on the first input text data to generate the first speech processing results. Once the server(s) 120 determines a first content source (e.g., a first speechlet or a first skill server(s) 125) that may provide content response to the first audio 11a, the server(s) 120 may establish (236) the first dialog session with the first content source.

The server(s) 120 receives (238) first output data from the first content source, with the first output data being generated based on the first speech processing results and the first user ID. The first output data may be associated with the first user ID and a dialog session ID. The server(s) 120 then causes (240) the device 110a to present first output content associated with the first output data.

While or after the device 110a presents the first content, the device 110a may capture audio 11b corresponding to speech of the second user 5b. The device 110a generates second input audio data corresponding to the audio 11b and sends the second input audio data to the server(s) 120.

The server(s) receives (242) the second input audio data and determines (244) second speech processing results. For example, the server(s) 120 may perform ASR on the second input audio data to generate second input text data and may perform NLU on the second input text data to generate the second speech processing results.

The input audio 11b, the second input audio data, and the second input text data may simply include a command payload that is not prefaced by a wakeword. Thus, the server(s) 120 may determine (246) the second input audio data corresponding to the first dialog session, different from the first dialog session.

Even though the second input audio data is associated with the first dialog session, the server(s) 120 may nonetheless determine (248) a second user ID associated with the second input audio data. For example, the server(s) 120 may use one or more user recognition processes described herein to determine the second user 5b spoke the audio 11b as well as determine the second user ID is associated with a second user profile associated with the second user 5b.

The server(s) 120 receives (250) second output data from the first content source, with the second output data being generated based on the second speech processing results and the second user ID. The second output data may be associated with the second user ID and the dialog session ID. The server(s) 120 then causes (252) the device 110a to present second output content associated with the second output data.

The system may operate using various components as described in FIG. 3. The various components illustrated FIG. 3 may be located on a same or different physical devices. Communication between various components illustrated in FIG. 3 may occur directly or across a network(s) 199.

The device 110a captures audio 11 using an audio capture component, such as a microphone or array of microphones. The device 110a, using a wakeword detection component 320, processes audio data corresponding to the audio 11 to determine if a keyword (e.g., a wakeword) is detected in the audio data. Following detection of a wakeword, the device 110a sends audio data 311, corresponding to the audio 11, to the server(s) 120.

Upon receipt by the server(s) 120, the audio data 311 may be sent to an orchestrator component 330. The orchestrator component 330 may include memory and logic that enables the orchestrator component 330 to transmit various pieces and forms of data to various components of the system.

The orchestrator component 330 sends the audio data 311 to a speech processing component 340. An ASR component 350 of the speech processing component 340 transcribes the audio data 311 into one or more textual interpretations representing speech contained in the audio data 311. The ASR component 350 interprets the spoken utterance based on a similarity between the spoken utterance and pre-established language models. For example, the ASR component 350 may compare the audio data 311 with models for sounds (e.g., subword units such as phonemes) and sequences of sounds to identify words that match the sequence of sounds spoken in the utterance represented in the audio data 311. The ASR component 350 sends text data generated thereby to an NLU component 360 of the speech processing component 340. The text data sent from the ASR component 350 to the NLU component 360 may include a top scoring textual interpretation of the audio data 311 or may include an N-best list including a group of textual interpretations of the audio data 311, and potentially their respective scores.

The NLU component 360 attempts to make a semantic interpretation of the phrases or statements represented in the text data input therein. That is, the NLU component 360 determines one or more meanings associated with the phrases or statements represented in the text data based on individual words represented in the text data. The NLU component 360 interprets a text string to derive an intent of the user (e.g., an action that the user desires be performed) as well as pertinent pieces of information in the text data that allow a device (e.g., the device 110, the server(s) 120, the skill server(s) 125, etc.) to complete the intent. For example, if the text data corresponds to "play music," the NLU component 260 may determine the user intended music to be output from one or more devices.

The server(s) 120 may include a user recognition component 395. The user recognition component 395 may determine a user that most likely spoke an input utterance as explained below in reference to FIG. 5.

The server(s) 120 may include a profile storage 370. The profile storage 370 may include a variety of information related to individual devices, groups of devices, individual users, groups of users, etc. that interact with the system as described below.

The orchestrator component 330 may send output from the NLU component 360 (e.g., text data including tags attributing meaning to the words and phrases represented in the text data), and optionally output from the user recognition component 395 and/or data from the profile storage 370, to one or more speechlets 390 and/or one or more skill servers 125 implementing one or more skills.

A "speechlet" may be software running on the server(s) 120 that is akin to a software application running on a traditional desktop computer. That is, a speechlet 390 may enable the server(s) 120 to execute specific functionality in order to provide data or produce some other output requested by a user. The server(s) 120 may be configured with more than one speechlet 390. For example, a weather service speechlet may enable the server(s) 120 to provide weather information, a car service speechlet may enable the server(s) 120 to book a trip with respect to a taxi or ride sharing service, an order pizza speechlet may enable the server(s) 120 to order a pizza with respect to a restaurant's online ordering system, etc. A speechlet may operate in conjunction between the server(s) 120 and other devices such as a local device 110 in order to complete certain functions. Inputs to the speechlet may come from speech processing interactions or through other interactions or input sources.

A speechlet may include a "skill." A skill may be software running on a skill server(s) 125 that is akin to an application. That is, a skill may enable the skill server(s) 125 to execute specific functionality in order to provide data or produce some other output requested by a user. A skill server(s) 125 may be configured with more than one skill. For example, a weather service skill may enable the skill server(s) 125 to provide weather information to the server(s) 120, a car service skill may enable the skill server(s) 125 to book a trip with respect to a taxi or ride sharing service, an order pizza skill may enable the skill server(s) 125 to order a pizza with respect to a restaurant's online ordering system, etc. A skill may operate in conjunction between the skill server(s) 125 and other devices such as the server(s) 120 or local device 110 in order to complete certain functions. Inputs to the skill may come from speech processing interactions or through other interactions or input sources.

The functions provided by one or more speechlets 390 may overlap or be different from the functions provided by one or more skills. Speechlets 390 may be implemented in some combination of hardware, software, firmware, etc.

The orchestrator component 330 may choose which speechlet(s) 390 and/or skill server(s) 125 to send data to based on the output of the NLU component 360. In an example, the orchestrator component 330 may send data to a music playing speechlet(s) 390 and/or skill server(s) 125 when the NLU component 360 outputs text data associated with a command to play music. In another example, the orchestrator component 330 may send data to a weather speechlet(s) 390 and/or skill server(s) 125 when the NLU component 360 outputs text data associated with a command to output weather information. In yet another example, the orchestrator component 330 may send data to a search engine speechlet(s) 390 and/or skill server(s) 125 when the NLU component 360 outputs text data associated with a command to obtain search results.

Speechlets 390 and skill servers 125 may output text data, which the orchestrator component 330 may send to a text-to-speech (TTS) component 380. The TTS component 380 may synthesize speech corresponding to the text data input therein. The orchestrator component 330 or other component of the server(s) 120 may send audio data synthesized by the TTS component 380 (or other output data from speechlet(s) 390 or skill server(s) 125) to the device 110a (or another device including a speaker and associated with the same user ID or customer ID) for output to one or more users.

The TTS component 380 may perform speech synthesis using one or more different methods. In one method of synthesis called unit selection, the TTS component 380 matches text data against a database of recorded speech. Matching units are selected and concatenated together to form audio data. In another method of synthesis called parametric synthesis, the TTS component 380 varies parameters such as frequency, volume, and noise to create an artificial speech waveform output. Parametric synthesis uses a computerized voice generator, sometimes called a vocoder.

The various components 330, 340, 350, 360, 390, 395 may exist in software, hardware, firmware, or some combination thereof.

Figure 4:
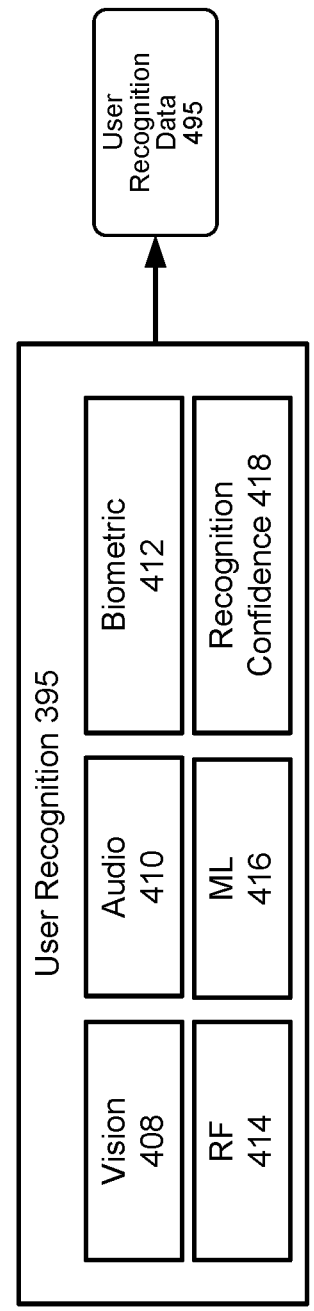
FIG. 4 is a schematic diagram of an illustrative architecture in which sensor data is combined to recognize one or more users according to embodiments of the present disclosure.

The user recognition component 295 may recognize one or more users using a variety of data. As illustrated in FIG. 4, the user recognition component 395 may include one or more subcomponents including a vision component 408, an audio component 410, a biometric component 412, a radio frequency (RF) component 414, a machine learning (ML) component 416, and a recognition confidence component 418. In some instances, the user recognition component 395 may monitor data and determinations from one or more subcomponents to determine an identity of one or more users in an environment. The user recognition component 395 may output user recognition data 495, which may include a user identifier associated with a user the system believes is interacting with the system. The user recognition data 495 may be used to inform NLU component 360 processes as well as processing performed by speechlets 390, skill servers 125, routing of output data, permission access to further information, etc.

The vision component 408 may receive data from one or more sensors capable of providing images (e.g., cameras) or sensors indicating motion (e.g., motion sensors). The vision component 408 can perform facial recognition or image analysis to determine an identity of a user and to associate that identity with a user profile associated with the user. In some instances, when a user is facing a camera, the vision component 408 may perform facial recognition and identify the user with a high degree of confidence. In other instances, the vision component 408 may have a low degree of confidence of an identity of a user, and the user recognition component 395 may utilize determinations from additional components to determine an identity of a user. The vision component 408 can be used in conjunction with other components to determine an identity of a user. For example, the user recognition component 395 may use data from the vision component 408 with data from the audio component 410 to identify what user's face appears to be speaking at the same time audio is captured by a device the user is facing for purposes of identifying a user who spoke an utterance.

The system may include biometric sensors that transmit data to the biometric component 412. For example, the biometric component 412 may receive data corresponding to fingerprints, iris or retina scans, thermal scans, weights of users, a size of a user, pressure (e.g., within floor sensors), etc., and may determine a biometric profile corresponding to a user. The biometric component 412 may distinguish between a user and sound from a television, for example. Thus, the biometric component 412 may incorporate biometric information into a confidence level for determining an identity of a user. Biometric information output by the biometric component 412 can be associated with a specific user profile such that the biometric information uniquely identifies a user profile of a user.

The RF component 414 may use RF localization to track devices that a user may carry or wear. For example, a user (and a user profile associated with the user) may be associated with a computing device. The computing device may emit RF signals (e.g., Wi-Fi, Bluetooth®, etc.). A device may detect the signal and indicate to the RF component 414 the strength of the signal (e.g., as a received signal strength indication (RSSI)). The RF component 414 may use the RSSI to determine an identity of a user (with an associated confidence level). In some instances, the RF component 414 may determine that a received RF signal is associated with a mobile device that is associated with a particular user.

In some instances, a device 110 may include some RF or other detection processing capabilities so that a user who speaks an utterance may scan, tap, or otherwise acknowledge his/her personal device (such as a phone) to the device 110. In this manner, the user may "register" with the system for purposes of the system determining who spoke a particular utterance. Such a registration may occur prior to, during, or after speaking of an utterance.

The ML component 416 may track the behavior of various users in the environment as a factor in determining a confidence level of the identity of the user. By way of example, a user may adhere to a regular schedule such that the user is outside an environment during the day (e.g., at work or at school). In this example, the ML component 416 would factor in past behavior and/or trends into determining the identity of the user that spoke an utterance to the system. Thus, the ML component 416 may user historical data and/or usage patterns over time to increase or decrease a confidence level of an identity of a user.

In some instances, the recognition confidence component 418 receives determinations from the various components 408, 410, 412, 414, and 416, and may determine a final confidence level associated with the identity of a user. In some instances, the confidence level may determine whether an action is performed. For example, if a user request includes a request to unlock a door, a confidence level may need to be above a threshold that may be higher than a confidence level needed to perform a user request associated with playing a playlist or resuming a location in an audiobook. The confidence level or other score data may be included in the user recognition data 495.

The audio component 410 may receive data from one or more sensors capable of providing an audio signal (e.g., the device 110a, one or more microphones, etc.) to facilitate recognizing a user. The audio component 410 may perform audio recognition on an audio signal to determine an identity of the user and an associated user profile. In some instances, aspects of the server(s) 120 may be configured at a computing device (e.g., a local server) within an environment. Thus, in some instances, the audio component 410 operating on a computing device in the environment may analyze all sound within the environment (e.g., without requiring a wake word) to facilitate recognizing a user. In some instances, the audio component 410 may perform voice recognition to determine an identity of a user.

The audio component 410 may also determine whether a user corresponds to a child or not a child based on audio characteristics. The audio component 410 may include a model trained with respect to speech characteristics common to children. Using the trained model, the audio component 410 may make a binary determination regarding whether the user that spoke the command is a child. The trained model(s) may determine a child is speaking based on acoustic properties of audio (e.g., pitch, prosody, energy) as well as other data/characteristics (e.g., vocabulary, sentence structure, direction of where audio of an utterance is received from (since children are shorter than adults)).

Child detection can be performed independently of user identity. For example, the system may use user recognition techniques and not be able to identify the specific speaking user, but may still be able to tell that the speaking user is a child or non-adult.

The audio component 410 may also perform user identification based on information relating to a spoken utterance input into the system for speech processing. For example, the audio component 410 may take as input the audio data 311 and/or output data from the ASR component 350. The audio component 410 may determine scores indicating whether the command originated from particular users. For example, a first score may indicate a likelihood that the command originated from a first user, a second score may indicate a likelihood that the command originated from a second user, etc. The audio component 410 may perform user recognition by comparing speech characteristics in the audio data 311 to stored speech characteristics of users.

Figure 5:
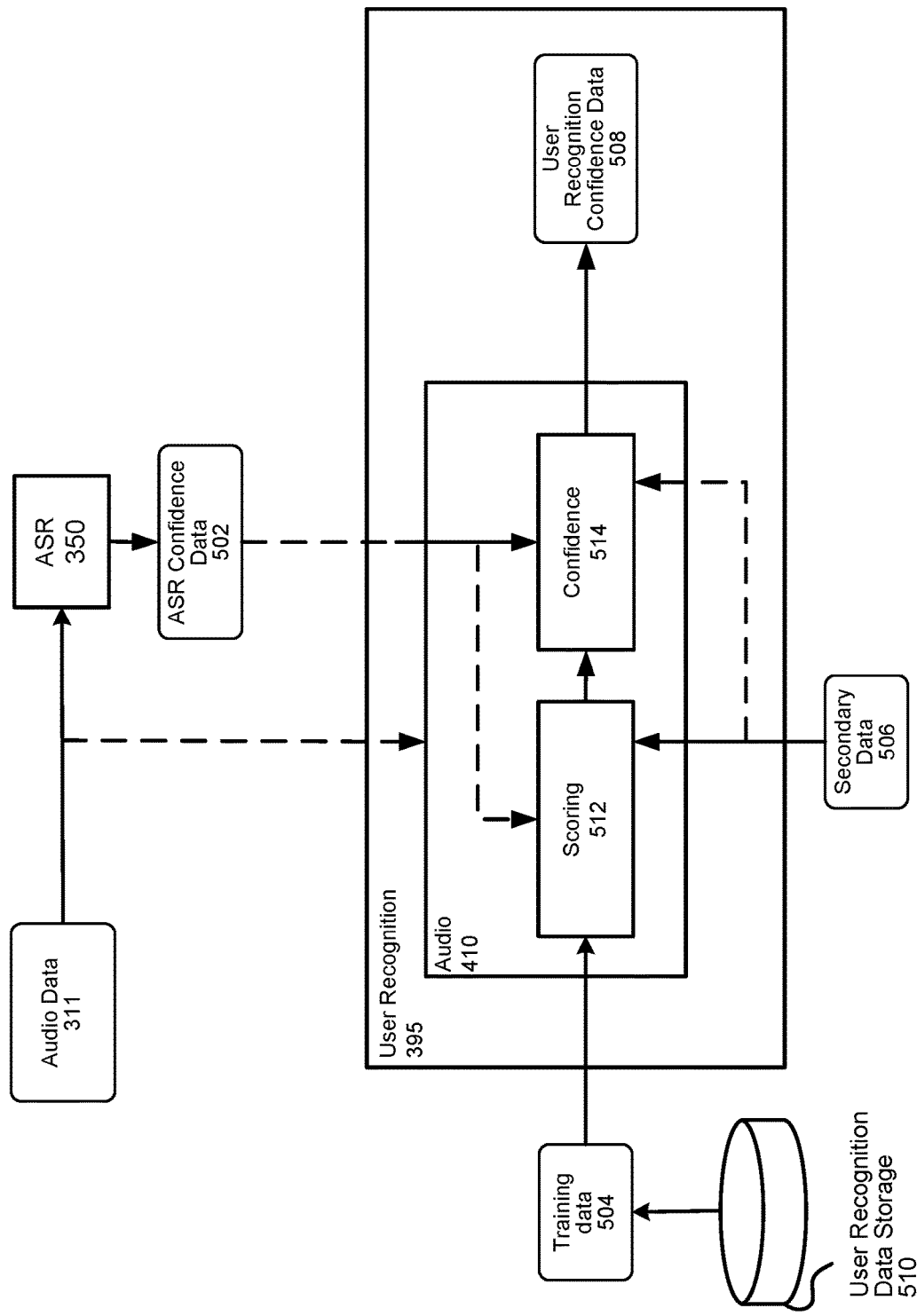
FIG. 5 is a system flow diagram illustrating user recognition according to embodiments of the present disclosure.

FIG. 5 illustrates the audio component 410 of the user recognition component 395 performing user recognition using audio data, for example input audio data 311 corresponding to an input utterance. In addition to outputting text data as described above, the ASR component 350 may also output ASR confidence data 502, which is passed to the user recognition component 395. The audio component 410 performs user recognition using various data including the audio data 311, training data 504 corresponding to sample audio data corresponding to known users, the ASR confidence data 502, and secondary data 506. The audio component 410 may output user recognition confidence data 508 that reflects a certain confidence that the input utterance was spoken by one or more particular users. The user recognition confidence data 508 may include an indicator of a verified user (such as a user ID corresponding to the speaker of the utterance) along with a confidence value corresponding to the user ID, such as a numeric value or binned value as discussed below. The user recognition confidence data 508 may be used by various components, including other components of the user recognition component 395 to recognize a user.

The training data 504 may be stored in a user recognition data storage 510. The user recognition data storage 510 may be stored by the server(s) 120, or may be a separate device. Further, the user recognition data storage 510 may be part of a user profile in the profile storage 370. The user recognition data storage 510 may be a cloud-based storage. The training data 504 stored in the user recognition data storage 510 may be stored as waveforms and/or corresponding features/vectors. The training data 510 may correspond to data from various audio samples, each audio sample associated with a known user and/or user identity. The audio samples may correspond to voice profile data for one or more users. For example, each user known to the system may be associated with some set of training data 504/voice profile data for the known user. Thus, the training data 504 may include a biometric representation of a user's voice. The audio component 410 may then use the training data 504 to compare against incoming audio data 311 to determine the identity of a user speaking an utterance. The training data 504 stored in the user recognition data storage 510 may thus be associated with multiple users of multiple devices. Thus, the training data 504 stored in the user recognition data storage 510 may be associated with both a user that spoke the respective utterance, as well as the device 110a that captured the respective utterance.

To perform user recognition, the audio component 410 may determine the device 110a from which the audio data 311 originated. For example, the audio data 311 may include a tag or other metadata indicating the device 110a. Either the device 110a or the server(s) 120 may tag the audio data 311 as such. The user recognition component 395 may send a signal to the user recognition data storage 510, with the signal requesting only training data 504 associated with known users of the device 110a from which the audio data 311 originated. This may include accessing a user profile(s) associated with the device 110a and then only inputting training data 504 associated with users corresponding to the user profile(s) of the device 110a. This limits the universe of possible training data the audio component 410 should consider at runtime when recognizing a user and thus decreases the amount of time to perform user recognition by decreasing the amount of training data 504 needed to be processed. Alternatively, the user recognition component 395 may access all (or some other subset of) training data 504 available to the system. Alternatively, the audio component 410 may access a subset of training data 504 of users potentially within an environment of the device 110a from which the audio data 311 originated, as may otherwise have been determined by the user recognition component 395.

If the audio component 410 receives training data 504 as an audio waveform, the audio component 410 may determine features/vectors of the waveform(s) or otherwise convert the waveform into a data format that can be used by the audio component 410 to actually perform the user recognition. The audio component 410 may then identify the user that spoke the utterance in the audio data 311 by comparing features/vectors of the audio data 311 to training features/vectors (either received from the user recognition data storage 510 or determined from training data 504 received from the user recognition data storage 510).

The audio component 410 may include a scoring component 512 which determines respective scores indicating whether the input utterance (represented by the audio data 311) was spoken by particular users (represented by the training data 504). The audio component 410 may also include a confidence component 514 that determines an overall confidence as the accuracy of the user recognition operations (such as those of the scoring component 512) and/or an individual confidence for each user potentially identified by the scoring component 512. The output from the scoring component 512 may include scores for all users with respect to which user recognition was performed (e.g., all users associated with the device 110a). For example, the output may include a first score for a first user, a second score for a second user, and third score for a third user, etc. Although illustrated as two separate components, the scoring component 512 and confidence component 514 may be combined into a single component or may be separated into more than two components.

The scoring component 512 and confidence component 514 may implement one or more trained machine learning models (such neural networks, classifiers, etc.) as known in the art. For example, the scoring component 512 may use probabilistic linear discriminant analysis (PLDA) techniques. PLDA scoring determines how likely it is that an input audio data feature vector corresponds to a particular training data feature vector for a particular user. The PLDA scoring may generate similarity scores for each training feature vector considered and may output the list of scores and users and/or the user ID of the speaker whose training data feature vector most closely corresponds to the input audio data feature vector. The scoring component 512 may also use other techniques such as GMMs, generative Bayesian models, or the like, to determine similarity scores.

The confidence component 514 may input various data including information about the ASR confidence 502, utterance length (e.g., number of frames or time of the utterance), audio condition/quality data (such as signal-to-interference data or other metric data), fingerprint data, image data, or other factors to consider how confident the audio component 410 is with regard to the scores linking users to the input utterance. The confidence component 514 may also consider the similarity scores and user IDs output by the scoring component 512. Thus, the confidence component 514 may determine that a lower ASR confidence represented in the ASR confidence data 502, or poor input audio quality, or other factors, may result in a lower confidence of the audio component 410. Whereas a higher ASR confidence represented in the ASR confidence data 502, or better input audio quality, or other factors, may result in a higher confidence of the audio component 410. Precise determination of the confidence may depend on configuration and training of the confidence component 514 and the models used therein. The confidence component 514 may operate using a number of different machine learning models/techniques such as GMM, neural networks, etc. For example, the confidence component 514 may be a classifier configured to map a score output by the scoring component 512 to a confidence.

The audio component 410 may output user recognition confidence data 508 specific to a single user, or multiple users in the form of an N-best list. For example, the audio component 410 may output user recognition confidence data 508 with respect to each user indicated in the profile associated with the device 110a from which the audio data 311 was received. The audio component 410 may also output user recognition confidence data 508 with respect to each user potentially in the location of the device 110a from which the audio data 311 was received.

The user recognition confidence data 508 may include particular scores (e.g., 0.0-1.0, 0-1000, or whatever scale the system is configured to operate). Thus the system may output an N-best list of potential users with confidence scores (e.g., John—0.2, Jane—0.8). Alternatively or in addition, the user recognition confidence data 508 may include binned recognition indicators. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." Thus, the system may output an N-best list of potential users with binned scores (e.g., John—low, Jane—high). Combined binned and confidence score outputs are also possible. Rather than a list of users and their respective scores and/or bins, the user recognition confidence data 508 may only include information related to the top scoring user as determined by the audio component 410. The scores and bins may be based on information determined by the confidence component 514. The audio component 410 may also output a confidence value that the scores/bins are correct, where the confidence value indicates how confident the audio component 410 is in the output results. This confidence value may be determined by the confidence component 514.

The confidence component 514 may determine individual user confidences and differences between user confidences when determining the user recognition confidence data 508. For example, if a difference between a first user's confidence score and a second user's confidence score is large, and the first user's confidence score is above a threshold, then the audio component 510 is able to recognize the first user as the user that spoke the utterance with a much higher confidence than if the difference between the users' confidences were smaller.

The audio component 410 may perform certain thresholding to avoid incorrect user recognition results being output. For example, the audio component 410 may compare a confidence score output by the confidence component 514 to a confidence threshold. If the confidence score is not above the confidence threshold (for example, a confidence of "medium" or higher), the user audio component 410 may not output user recognition confidence data 508, or may only include in that data 508 an indication that a user speaking the utterance could not be verified. Further, the audio component 410 may not output user recognition confidence data 508 until enough input audio data 311 is accumulated and processed to verify the user above a threshold confidence. Thus, the audio component 410 may wait until a sufficient threshold quantity of audio data 311 of the utterance has been processed before outputting user recognition confidence data 508. The quantity of received audio data 311 may also be considered by the confidence component 514.

The audio component 410 may be defaulted to output binned (e.g., low, medium, high) user recognition confidence data 508. However, such may be problematic from the speechlet(s) 390 and skill server(s) 125 perspectives. For example, if the audio component 410 computes a single binned confidence for multiple users, a speechlet(s) 390/skill server(s) 125 may not be able to determine which user to determine content with respect to. In this situation, the audio component 410 may be configured to override its default setting and output user recognition confidence data 508 including values (e.g., 0.0-1.0) associated with the users associated with the same binned confidence. This enables the speechlet(s) 390/skill server(s) 125 to select content associated with the user associated with the highest confidence value. The user recognition confidence data 508 may also include the user IDs corresponding to the potential user(s) who spoke the utterance.

The user recognition component 395 may combine data from components 408-418 to determine the identity of a particular user. As part of its audio-based user recognition operations, the audio component 410 may use secondary data 506 to inform user recognition processing. Thus, a trained model or other component of the audio component 410 may be trained to take secondary data 506 as an input feature when performing recognition. Secondary data 506 may include a wide variety of data types depending on system configuration and may be made available from other sensors, devices, or storage such as user profile data, etc. The secondary data 506 may include a time of day at which the audio data 311 was captured, a day of a week in which the audio data 311 was captured, the text data output by the ASR component 350, NLU results data, and/or other data.

In one example, secondary data 506 may include image data or video data. For example, facial recognition may be performed on image data or video data received corresponding to the received audio data 311. Facial recognition may be performed by the vision component 408, or by another component of the server(s) 120. The output of the facial recognition process may be used by the audio component 410. That is, facial recognition output data may be used in conjunction with the comparison of the features/vectors of the audio data 311 and training data 504 to perform more accurate user recognition.

The secondary data 506 may also include location data of the device 110a. The location data may be specific to a building within which the device 110a is located. For example, if the device 110a is located in user A's bedroom, such location may increase user recognition confidence data associated with user A, but decrease user recognition confidence data associated with user B.

The secondary data 506 may also include data related to the profile of the device 110a. For example, the secondary data 506 may further include type data indicating a type of the device 110a. Different types of devices may include, for example, a smart watch, a smart phone, a tablet computer, and a vehicle. The type of device may be indicated in the profile associated with the device. For example, if the device 110a from which the audio data 311 was received is a smart watch or vehicle belonging to user A, the fact that the device 110a belongs to user A may increase user recognition confidence data associated with user A, but decrease user recognition confidence data associated with user B. Alternatively, if the device 110a from which the audio data 311 was received is a public or semi-public device, the system may use information about the location of the device to cross-check other potential user locating information (such as calendar data, etc.) to potentially narrow the potential users to be recognized with respect to the audio data 311.

The secondary data 506 may additionally include geographic coordinate data associated with the device 110a. For example, a profile associated with a vehicle may indicate multiple users (e.g., user A and user B). The vehicle may include a global positioning system (GPS) indicating latitude and longitude coordinates of the vehicle when the audio data 311 is captured by the vehicle. As such, if the vehicle is located at a coordinate corresponding to a work location/building of user A, such may increase user recognition confidence data associated with user A, but decrease user recognition confidence data of all other users indicated in the profile associated with the vehicle. Global coordinates and associated locations (e.g., work, home, etc.) may be indicated in a user profile associated with the device 110a. The global coordinates and associated locations may be associated with respective users in the user profile storage 370.

The secondary data 506 may also include other data/signals about activity of a particular user that may be useful in performing user recognition of an input utterance. For example, if a user has recently entered a code to disable a home security alarm, and the utterance corresponds to a device at the home, signals from the home security alarm about the disabling user, time of disabling, etc. may be reflected in the secondary data 506 and considered by the audio component 410. If a mobile device (such as a phone, Tile, dongle, or other device) known to be associated with a particular user is detected proximate to (for example physically close to, connected to the same WiFi network as, or otherwise nearby) the device 110a, this may be reflected in the secondary data 506 and considered by the audio component 410.

The user recognition confidence data 508 output by the audio component 410 may be used by other components of the user recognition component 395 and/or may be sent to one or more speechlets 390, skill servers 125, the orchestrator 330, or to other components. The speechlet(s) 390/skill server(s) 125 that receives the NLU results and the user recognition confidence score data 508 (or other user recognition results as output by the user recognition component 395) may be determined by the server(s) 120 as corresponding to content responsive to the utterance in the audio data 311. For example, if the audio data 311 includes the utterance "Play my music," the NLU results and user recognition confidence data 508 (or other output user recognition data) may be sent to a music playing speechlet(s) 390/skill server(s) 125.

Figure 6:
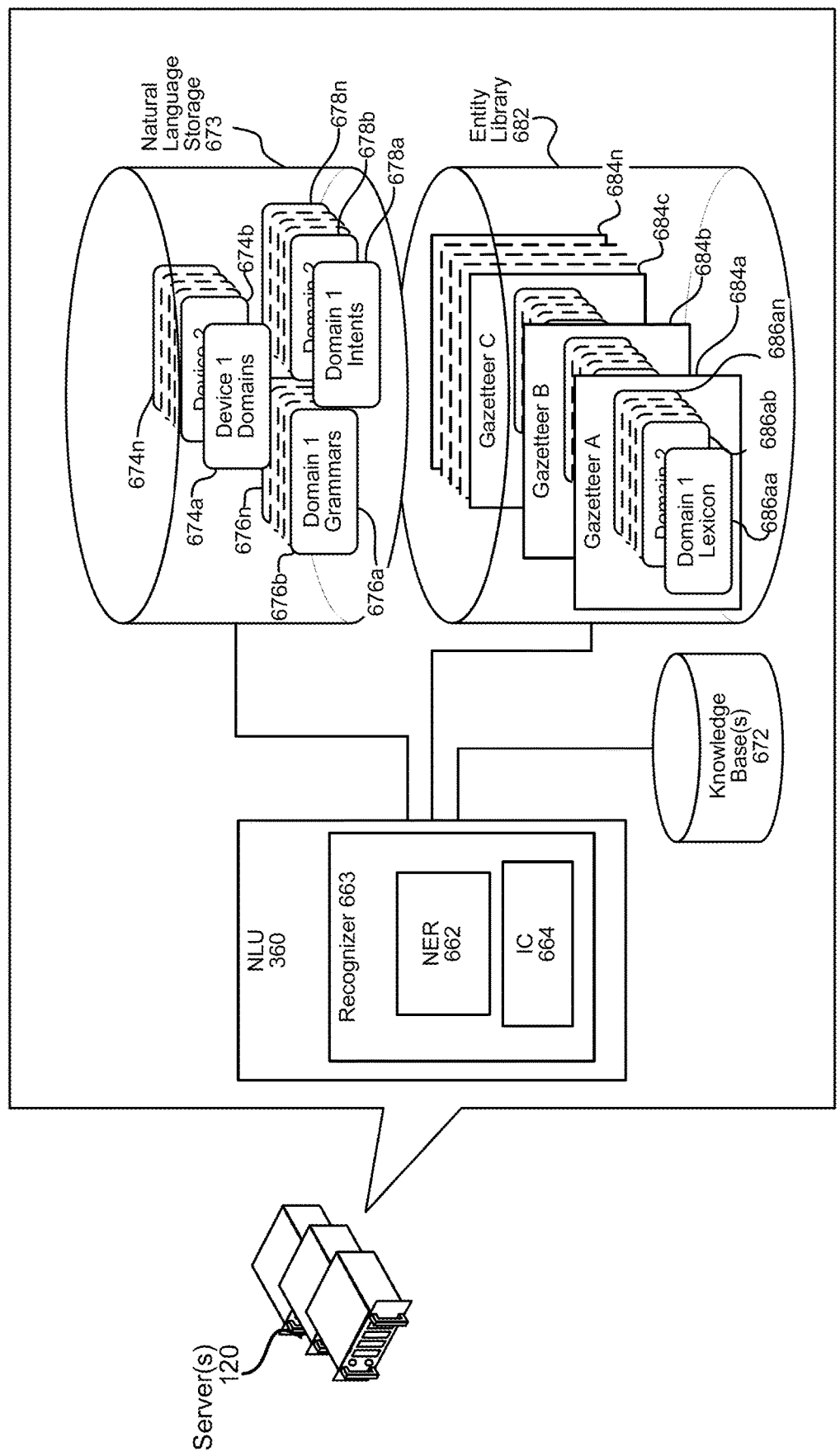
FIG. 6 is a conceptual diagram of how natural language processing is performed according to embodiments of the present disclosure.

FIG. 6 illustrates how NLU processing is performed on audio data. Generally, the NLU component 360 attempts to make a semantic interpretation of text represented in text data (e.g., ASR results output by the ASR component 350). That is, the NLU component 360 determines the meaning behind the text represented in text data based on the individual words. The NLU component 360 interprets text to derive an intent or a desired action from an utterance as well as the pertinent pieces of information in the text that allow a device (e.g., device 110a, server(s) 120, speechlet(s) 390, skill server(s) 125) to complete that action.

The NLU component 360 may process text data including several textual interpretations of a single utterance. For example, if the ASR component 350 outputs ASR results including an N-best list of textual interpretations, the NLU component 360 may process the text data with respect to all (or a portion of) the textual interpretations represented therein.

The NLU component 360 may include one or more recognizers 663. Each recognizer 663 may be associated with a different speechlet 390. The NLU component 360 may determine a speechlet 390 potentially associated with a textual interpretation represented in text data input thereto in order to determine the proper recognizer 663 to process the textual interpretation. The NLU component 360 may determine a single textual interpretation is potentially associated with more than one speechlet 390. Multiple recognizers 663 may be functionally linked (e.g., a telephony/communications recognizer and a calendaring recognizer may utilize data from the same contact list).

If the NLU component 360 determines a specific textual interpretation is potentially associated with multiple speechlets 390, the recognizers 663 associated with the speechlets 390 may process the specific textual interpretation in parallel. For example, if a specific textual interpretation potentially implicates both a communications speechlet and a music speechlet, a recognizer associated with the communications speechlet may process the textual interpretation in parallel, or substantially in parallel, with a recognizer associated with the music speechlet processing the textual interpretation. The output generated by each recognizer may be scored, with the overall highest scored output from all recognizers ordinarily being selected to be the correct result.

The NLU component 360 may communicate with various storages to determine the potential speechlet(s) associated with a textual interpretation. The NLU component 360 may communicate with an NLU storage 673, which includes databases of devices (674a-674n) identifying speechlets associated with specific devices. For example, the device 110a may be associated with speechlets for music, calendaring, contact lists, device-specific communications, etc. In addition, the NLU component 360 may communicate with an entity library 682, which includes database entries about specific services on a specific device, either indexed by device ID, user ID, or group user ID, or some other indicator.

Each recognizer 663 may include a named entity recognition (NER) component 662. The NER component 662 attempts to identify grammars and lexical information that may be used to construe meaning with respect to a textual interpretation input therein. The NER component 662 identifies portions of text represented in text data input into the NLU component 360 that correspond to a named entity that may be recognizable by the system. The NER component 662 (or other component of the NLU component 360) may also determine whether a word refers to an entity that is not explicitly mentioned in the utterance text, for example "him," "her," "it" or other anaphora, exophora or the like.

Each recognizer 663, and more specifically each NER component 662, may be associated with a particular grammar model and/or database 676, a particular set of intents/actions 678, and a particular personalized lexicon 686. Each gazetteer 684 may include speechlet-indexed lexical information associated with a particular user and/or device. For example, the Gazetteer A (684a) includes speechlet-indexed lexical information 686aa to 686an.

A user's music speechlet lexical information might include album titles, artist names, and song names, for example, whereas a user's contact-list lexical information might include the names of contacts. Since every user's music collection and contact list is presumably different, this personalized information improves entity resolution.

An NER component 662 applies grammar models 676 and lexical information 686 associated with the speechlet (associated with the recognizer 663 implementing the NER component 662) to determine a mention of one or more entities in a textual interpretation input therein. In this manner, the NER component 662 identifies "slots" (i.e., particular words in a textual interpretation) that may be needed for later command processing. The NER component 662 may also label each slot with a type of varying levels of specificity (e.g., noun, place, city, artist name, song name, etc.).

Each grammar model 676 includes the names of entities (i.e., nouns) commonly found in speech about the particular speechlet to which the grammar model 676 relates, whereas the lexical information 686 is personalized to the user(s) and/or the device 110a from which the audio data 311 originated. For example, a grammar model 676 associated with a shopping speechlet may include a database of words commonly used when people discuss shopping.

A downstream process called named entity resolution actually links a portion of text to an actual specific entity known to the system. To perform named entity resolution, the NLU component 360 may utilize gazetteer information (684a-684n) stored in an entity library storage 682. The gazetteer information 684 may be used to match text represented in text data output by the ASR component 350 with different entities, such as song titles, contact names, etc. Gazetteers may be linked to users (e.g., a particular gazetteer may be associated with a specific user's music collection), may be linked to certain speechlet categories (e.g., shopping, music, video, communications, etc.), or may be organized in a variety of other ways.

Each recognizer 663 may also include an intent classification (IC) component 664. The IC component 664 parses an input textual interpretation to determine an intent(s) of the speechlet associated with the recognizer 663 that potentially corresponds to the textual interpretation. An intent corresponds to an action to be performed that is responsive to the command represented by the textual interpretation. The IC component 664 may communicate with a database 678 of words linked to intents. For example, a music intent database may link words and phrases such as "quiet," "volume off," and "mute" to a "mute" intent. The IC component 664 identifies potential intents by comparing words in the textual interpretation to the words and phrases in an intents database 678 associated with the speechlet that is associated with the recognizer 663 implementing the IC component 664.

The intents identifiable by a specific IC component 664 are linked to speechlet-specific (i.e., the speechlet associated with the recognizer 663 implementing the IC component 664) grammar frameworks 676 with "slots" to be filled. Each slot of a grammar framework 676 corresponds to a portion of the text interpretation that the system believes corresponds to an entity. For example, a grammar framework 676 corresponding to a <PlayMusic> intent may correspond to textual interpretation sentence structures such as "Play {Artist Name}," "Play {Album Name}," "Play {Song name}," "Play {Song name} by {Artist Name}," etc. However, to make resolution more flexible, grammar frameworks 676 may not be structured as sentences, but rather based on associating slots with grammatical tags.

For example, an NER component 662 may parse a textual interpretation to identify words as subject, object, verb, preposition, etc. based on grammar rules and/or models prior to recognizing named entities in the textual interpretation. An IC component 664 (implemented by the same recognizer 663 as the NER component 662) may use the identified verb to identify an intent. The NER component 662 may then determine a grammar model 676 associated with the identified intent. For example, a grammar model 676 for an intent corresponding to <PlayMusic> may specify a list of slots applicable to play the identified "object" and any object modifier (e.g., a prepositional phrase), such as {Artist Name}, {Album Name}, {Song name}, etc. The NER component 662 may then search corresponding fields in a lexicon 686 associated with the speechlet associated with the recognizer 663 implementing the NER component 662, attempting to match words and phrases in the textual interpretation the NER component 662 previously tagged as a grammatical object or object modifier with those identified in the lexicon 686.

An NER component 662 may perform semantic tagging, which is the labeling of a word or combination of words according to their type/semantic meaning. An NER component 662 may parse a textual interpretation using heuristic grammar rules, or a model may be constructed using techniques such as hidden Markov models, maximum entropy models, log linear models, conditional random fields (CRF), and the like. For example, an NER component 662 implemented by a music speechlet recognizer 663 may parse and tag a textual interpretation corresponding to "play mother's little helper by the rolling stones" as {Verb}: "Play," {Object}: "mother's little helper," {Object Preposition}: "by," and {Object Modifier}: "the rolling stones." The NER component 662 identifies "Play" as a verb based on a word database associated with the music speechlet, which an IC component 664 (also implemented by the music speechlet recognizer 663) may determine corresponds to a<PlayMusic>intent. At this stage, no determination has been made as to the meaning of "mother's little helper" and "the rolling stones," but based on grammar rules and models, the NER component 662 has determined that the text of these phrases relates to the grammatical object (i.e., entity) of the textual interpretation.

The frameworks linked to the intent are then used to determine what database fields should be searched to determine the meaning of these phrases, such as searching a user's gazetteer 684 for similarity with the framework slots. For example, a framework for a <PlayMusic> intent might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 684 does not resolve a slot/field using gazetteer information, the NER component 662 may search the database of generic words associated with the speechlet (in the knowledge base 672). For example, if the textual interpretation was "play songs by the rolling stones," after failing to determine an album name or song name called "songs" by "the rolling stones," the NER component 662 may search the speechlet vocabulary for the word "songs." In the alternative, generic words may be checked before the gazetteer information, or both may be tried, potentially producing two different results.

The NLU component 360 may tag the textual interpretation to attribute meaning to the textual interpretation. For example, the NLU component 360 may tag "play mother's little helper by the rolling stones" as: {intent}<PlayMusic>, {artist name} rolling stones, {media type} SONG, and {song title} mother's little helper. For further example, the NLU component 360 may tag "play songs by the rolling stones" as: {intent}<PlayMusic>, {artist name} rolling stones, and {media type} SONG.

Certain recognizers 663 may only be authorized to operate for certain users. For example, some recognizers 663 may only be authorized to operate for adult users (e.g., users of eighteen years of age or older). The NLU component 360 may use some combination of user recognition data 495 and user profile data to confirm the user's identity/type. Based thereon, the NLU component 360 may determine which recognizers 663 may operate with respect to input text data (i.e., ASR results 741).

Each recognizer 663 may output data corresponding to a single textual interpretation or to an N-best list of textual interpretations. The NLU component 360 may compile the output data of the recognizers 663 into a single N-best list, and may send N-best list data 740 (representing the N-best list) to a pruning component 750 (as illustrated in FIG. 7). The tagged textual interpretations in the N-best list data 740 may each be associated with a respective score indicating the tagged textual interpretation corresponds to the speechlet associated with the recognizer 663 from which the tagged textual interpretation was output. For example, the N-best list data 740 may be represented as:

[0.95] Intent: <PlayMusic> ArtistName: Lady Gaga SongName: Poker Face

[0.70] Intent: <PlayVideo> ArtistName: Lady Gaga VideoName: Poker Face

[0.01] Intent: <PlayMusic> ArtistName: Lady Gaga AlbumName: Poker Face

[0.01] Intent: <PlayMusic> SongName: Pokerface

The pruning component 750 creates a new, shorter N-best list (i.e., represented in N-best list data 760 discussed below) based on the N-best list data 740. The pruning component 750 may sort the tagged textual interpretations represented in the N-best list data 740 according to their respective scores.

The pruning component 750 may perform score thresholding with respect to the N-best list data 740. For example, the pruning component 750 may select textual interpretations represented in the N-best list data 740 associated with a score satisfying (e.g., meeting and/or exceeding) a score threshold. The pruning component 750 may also or alternatively perform a number of textual interpretation thresholding. For example, the pruning component 750 may select the top scoring textual interpretation(s) associated with each different category of speechlet (e.g., music, shopping, communications, etc.) represented in the N-best list data 740, with the new N-best list data 760 including a total number of textual interpretations meeting or falling below a threshold number of textual interpretations. The purpose of the pruning component 750 is to create a new list of top scoring textual interpretations so that downstream (more resource intensive) processes may only operate on the tagged textual interpretations that most likely correspond to the command input to the system.

The NLU component 360 may also include a light slot filler component 752. The light slot filler component 752 can take text from slots represented in the textual interpretation(s) output by the pruning component 750 and alter it to make the text more easily processed by downstream components. The light slot filler component 752 may perform low latency operations that do not involve heavy operations such as reference to a knowledge base. The purpose of the light slot filler component 752 is to replace words with other words or values that may be more easily understood by downstream components. For example, if a textual interpretation includes the word "tomorrow," the light slot filler component 752 may replace the word "tomorrow" with an actual date for purposes of downstream processing. Similarly, the light slot filler component 752 may replace the word "CD" with "album" or the words "compact disc." The replaced words are then included in the N-best list data 760.

The NLU component 360 sends the N-best list data 760 to an entity resolution component 770. The entity resolution component 770 can apply rules or other instructions to standardize labels or tokens from previous stages into an intent/slot representation. The precise transformation may depend on the speechlet (e.g., for a travel speechlet, the entity resolution component 770 may transform a text mention of "Boston airport" to the standard BOS three-letter code referring to the airport). The entity resolution component 770 can refer to an authority source (e.g., a knowledge base) that is used to specifically identify the precise entity referred to in each slot of each textual interpretation represented in the N-best list data 760. Specific intent/slot combinations may also be tied to a particular source, which may then be used to resolve the text. In the example "play songs by the stones," the entity resolution component 770 may reference a personal music catalog, Amazon Music account, user profile 802 (described herein), or the like. The entity resolution component 770 may output data including an altered N-best list that is based on the N-best list represented in the N-best list data 760, but also includes more detailed information (e.g., entity IDs) about the specific entities mentioned in the slots and/or more detailed slot data that can eventually be used by a speechlet(s) 390 which may be incorporated into the server(s) 120 components or pipeline or may be on a separate device(s) (e.g., a skill server(s) 125) in communication with the server(s) 120. The NLU component 360 may include multiple entity resolution components 770 and each entity resolution component 770 may be specific to one or more speechlets.

The entity resolution component 770 may not be successful in resolving every entity and filling every slot represented in the N-best list represented in the N-best list data 760. This may result in the entity resolution component 770 outputting incomplete results. The NLU component 360 may include a final ranker component 790, which may consider such errors when determining how to rank the tagged textual interpretations for potential execution. For example, if a book speechlet recognizer 663 outputs a tagged textual interpretation including a <ReadBook> intent flag, but the entity resolution component 770 cannot find a book with a title matching the text of the item, the final ranker component 790 may re-score that particular tagged textual interpretation to be given a lower score. The final ranker component 790 may also assign a particular confidence to each tagged textual interpretation input therein. The confidence score of a particular tagged textual interpretation may be affected by whether the tagged textual interpretation has unfilled slots. For example, if a tagged textual interpretation associated with a first speechlet includes slots that are all filled/resolved, that tagged textual interpretation may be associated with a higher confidence than another tagged textual interpretation including at least some slots that are unfilled/unresolved.

The final ranker component 790 may apply re-scoring, biasing, or other techniques to obtain the most preferred tagged and resolved textual interpretation. To do so, the final ranker component 790 may consider not only the data output by the entity resolution component 770, but may also consider other data 791. The other data 791 may include a variety of information. For example, the other data 791 may include speechlet rating or popularity data. For example, if one speechlet has a particularly high rating, the final ranker component 790 may increase the score of a textual interpretation(s) associated with or otherwise invoking that particular speechlet. The other data 791 may also include information about speechlets that have been specifically enabled by the user. For example, the final ranker component 790 may assign higher scores to textual interpretations associated with or otherwise invoking enabled speechlets than textual interpretations associated with or otherwise invoking non-enabled speechlets. User history may also be considered, such as if the user regularly uses a particular speechlet or does so at particular times of day. Date, time, location, weather, type of device 110*a*, user ID, context, and other information may also be considered. For example, the final ranker component 790 may consider when any particular speechlets are currently active (e.g., music being played, a game being played, etc.).

Following final ranking, the NLU component 360 may output NLU output data 785. The NLU component 360 may send the NLU output data 785 to the orchestrator component 330, which sends the NLU output data 785 to an appropriate speechlet 390 or skill server(s) 125 (e.g., one configured to execute a command based on the textual interpretation represented in the NLU output data 785). The NLU output data 785 may include an indicator of the intent of the textual interpretation along with data associated with the intent, for example an indication that the intent is <PlayMusic> and the music to be played is "aAdele." Multiple instances of NLU output data (e.g., 785a-785n) may be output for a given set of text data input into the NLU component 360.

The speechlet(s) 390/skill server(s) 125 provides the server(s) 120 with data responsive to the NLU output data 785 received thereby. If the data is text data that needs to be converted to computerized speech, the orchestrator component 330 sends the text data to the TTS component 380.

User recognition data 495 may also be used by the NLU component 360 and/or the speechlet 390/skill server(s) 125 to ensure that any user specific commands are properly interpreted and executed.

A user identified using techniques described herein may be associated with a user identifier (ID), user profile, or other information known about the user by the system. As part of the user recognition techniques described herein, the system may determine the user identifier, user profile, or other such information. The profile storage 370 may include data corresponding to profiles that may be used by the system to perform speech processing. Such profiles may include a user profile that links various data about a user such as user preferences, user owned devices, address information, contacts, enabled speechlets, payment information, etc. Each user profile may be associated with a different user ID. A profile may be an umbrella profile specific to a group of users. That is, a user profile may encompass two or more individual user profiles, each associated with a unique respective user ID. For example, a profile may be a household profile that encompasses user profiles associated with multiple users of a single household. A profile may include preferences shared by all the user profiles encompassed thereby. Each user profile encompassed under a single user profile may include preferences specific to the user associated therewith. That is, each user profile may include preferences unique with respect to one or more other user profiles encompassed by the same profile. A user profile may be a stand-alone profile or may be encompassed under a group profile.

A profile may also be a device profile corresponding to information about a particular device, for example a device ID, location, owner entity, whether the device is in a public, semi-public, or private location (which may be indicated by a public and/or semi-public flag), device capabilities, device hardware, or the like.

A profile may also be an entity profile, for example belonging to a business, organization, or other non-user entity. Such an entity profile may include information that may otherwise be found in a user and/or device profile, only such information is associated with the entity. The entity profile may include information regarding which users and/or devices are associated with the entity.

For example, as illustrated in FIG. 8, a group profile 802 may include information about users, devices, and locations of the devices. In the example illustrated, the group profile 802 is associated with a home and lists four devices: one device in a living room, one device in a kitchen, one device in a den/office, and one device in a bedroom. Various other information may also be stored and/or associated with a profile.

Figure 9A:
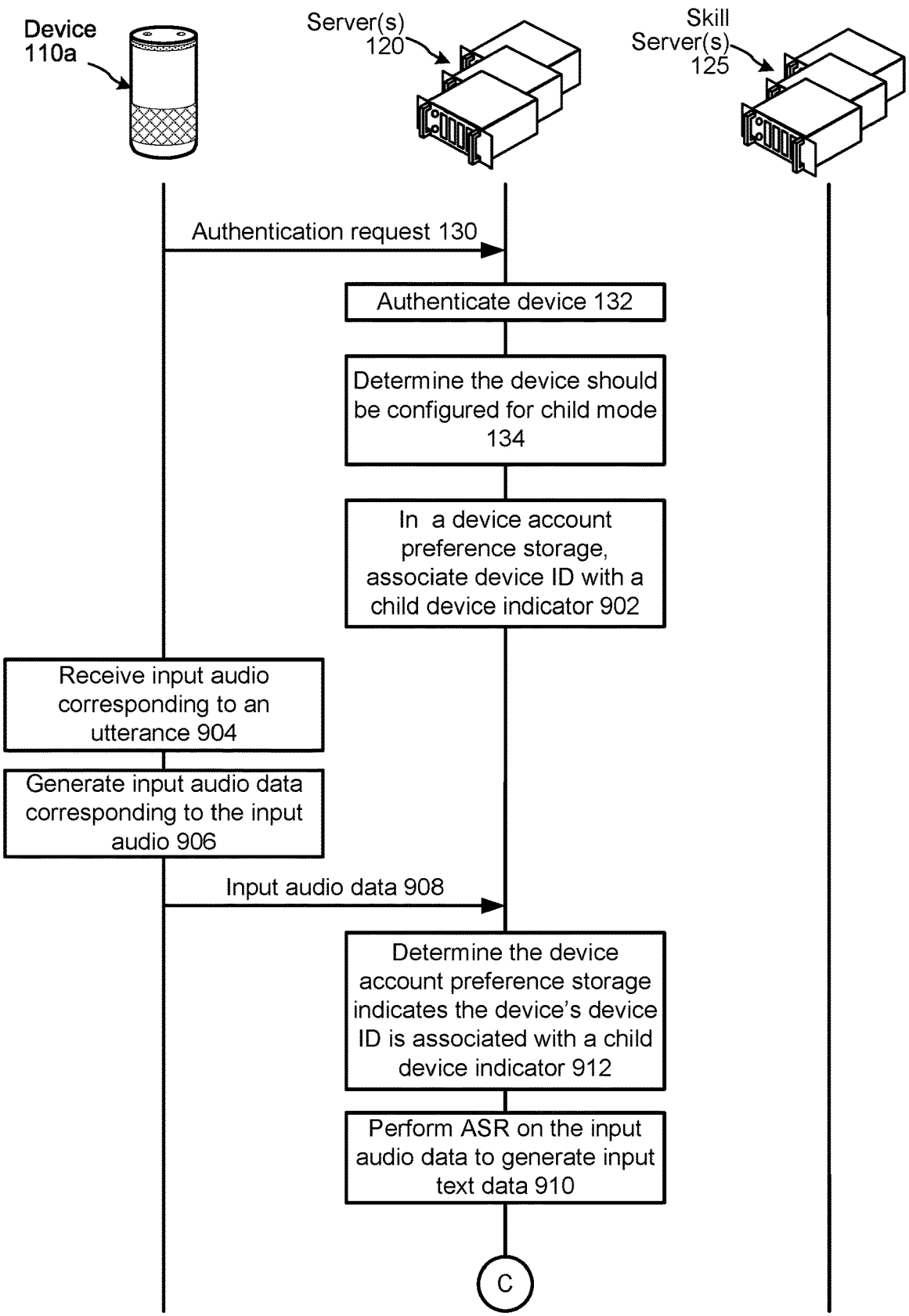
Figure 10A:
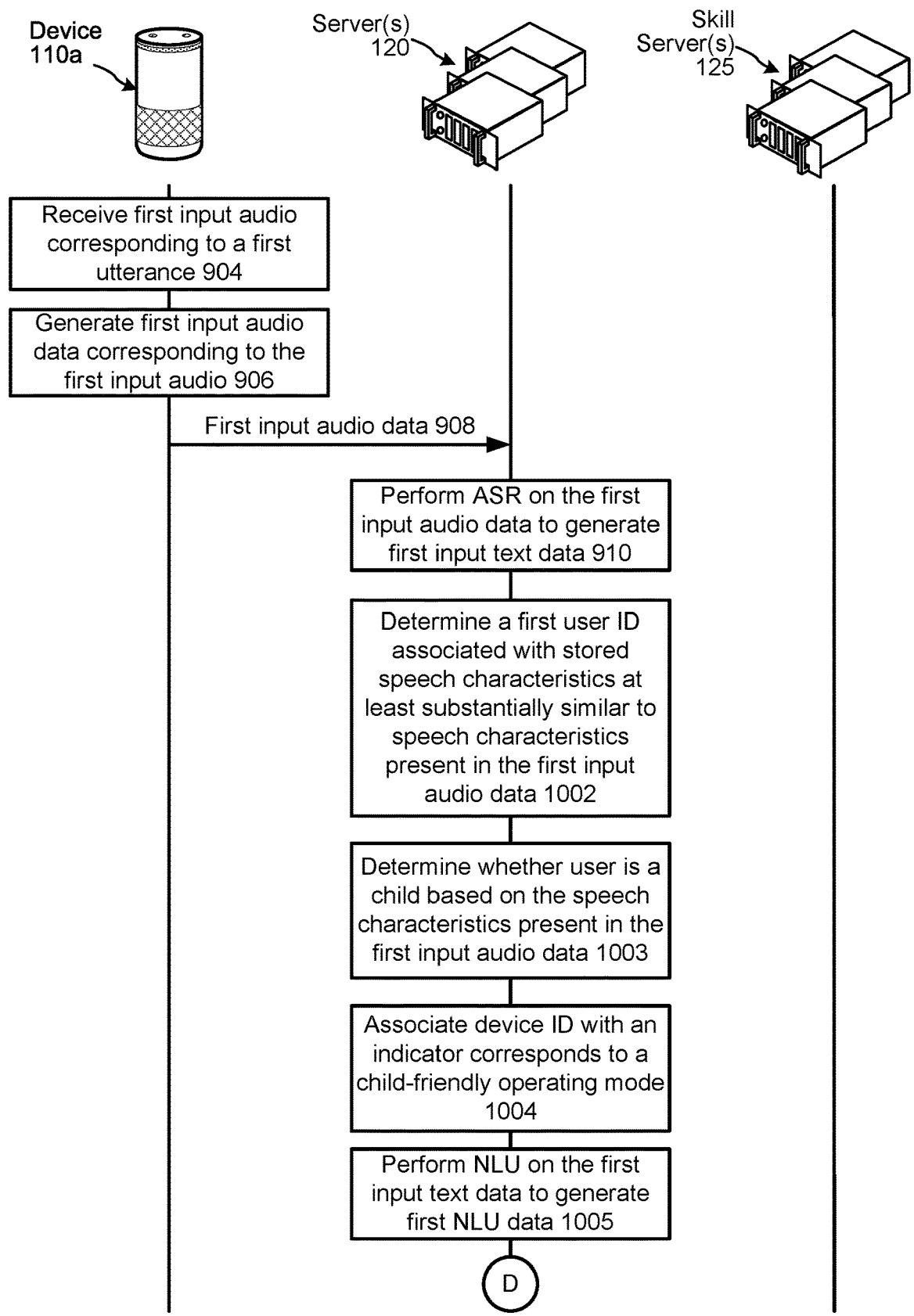
Figure 10B:
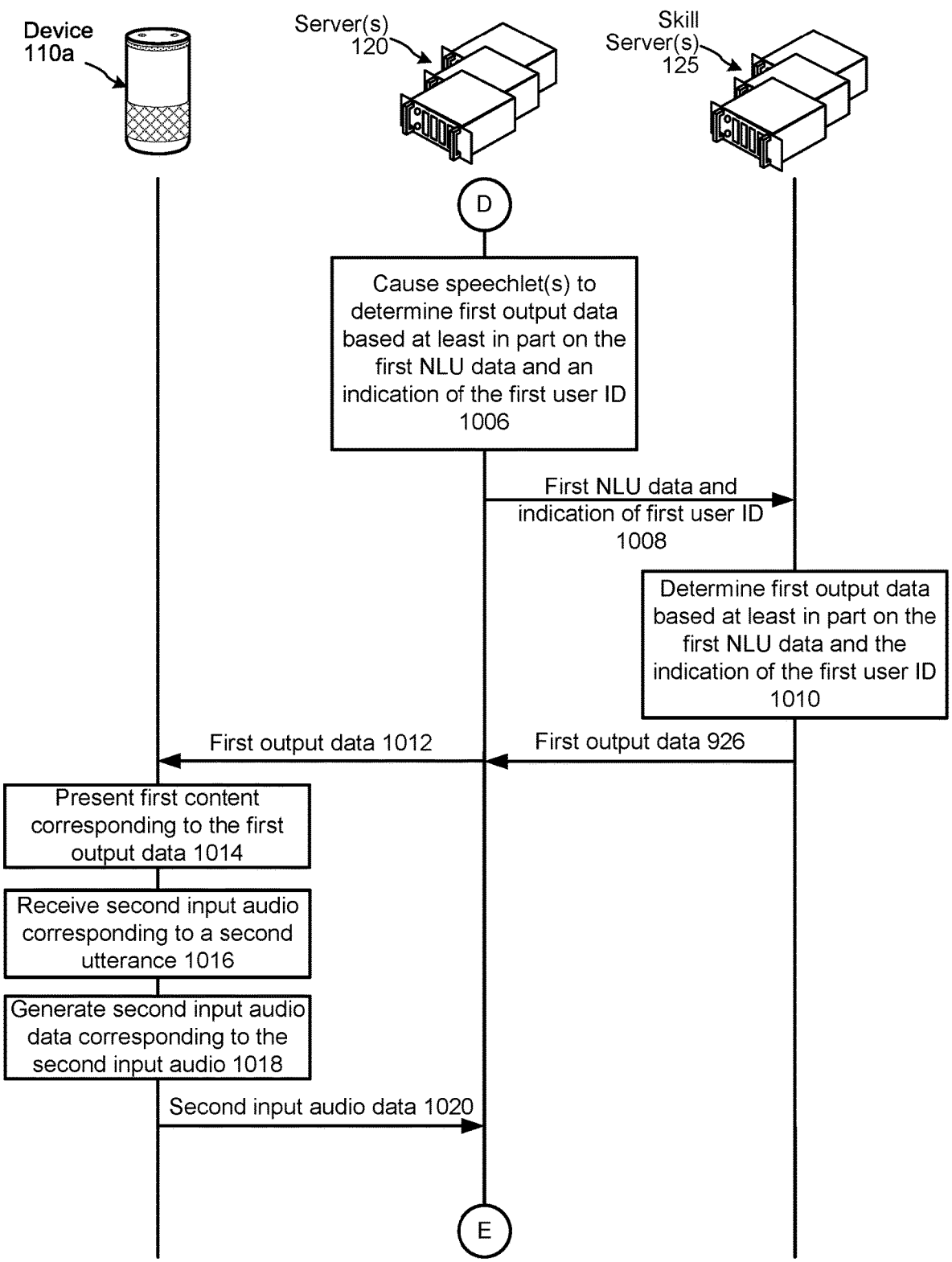
Figure 10C:
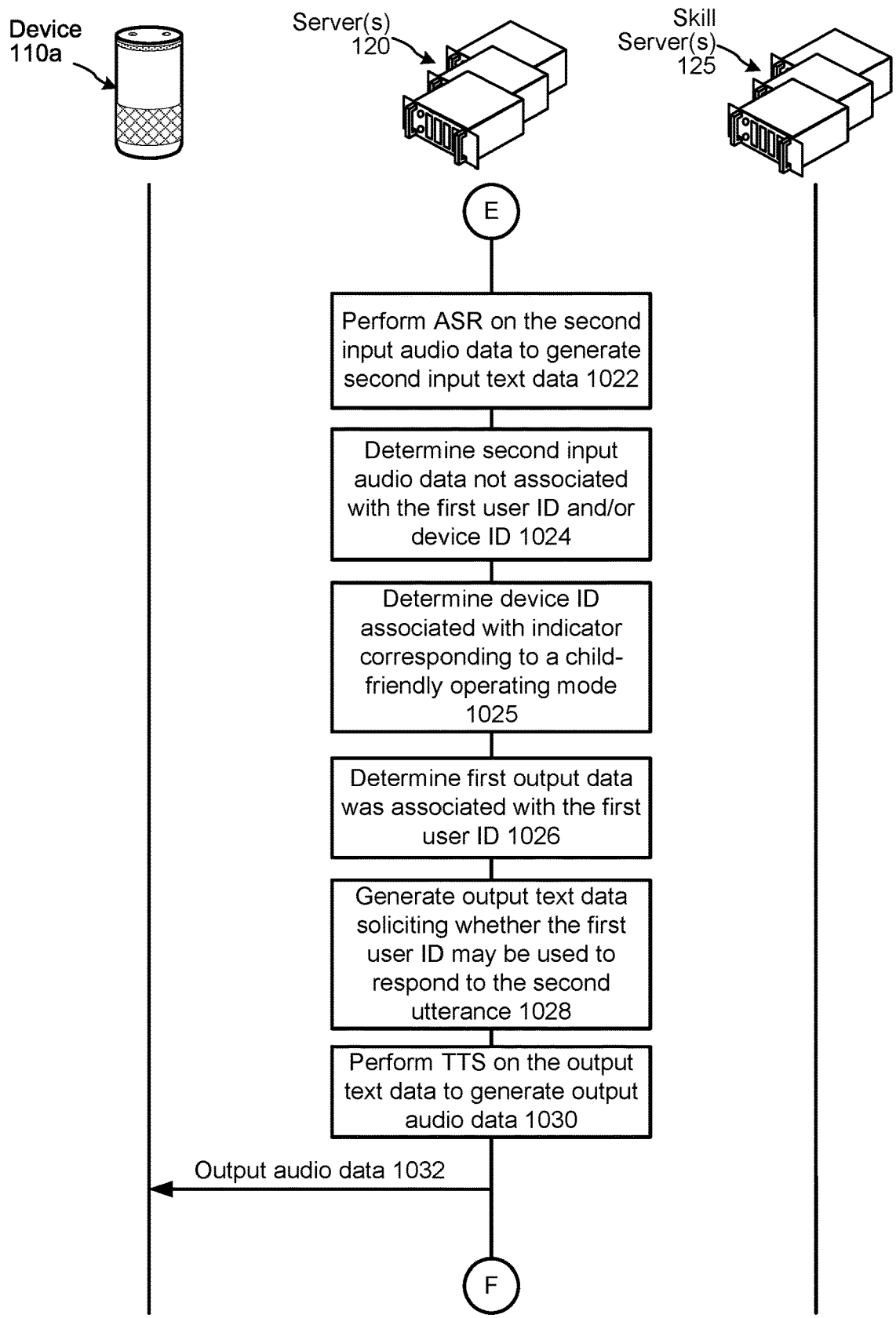
Figure 10D:
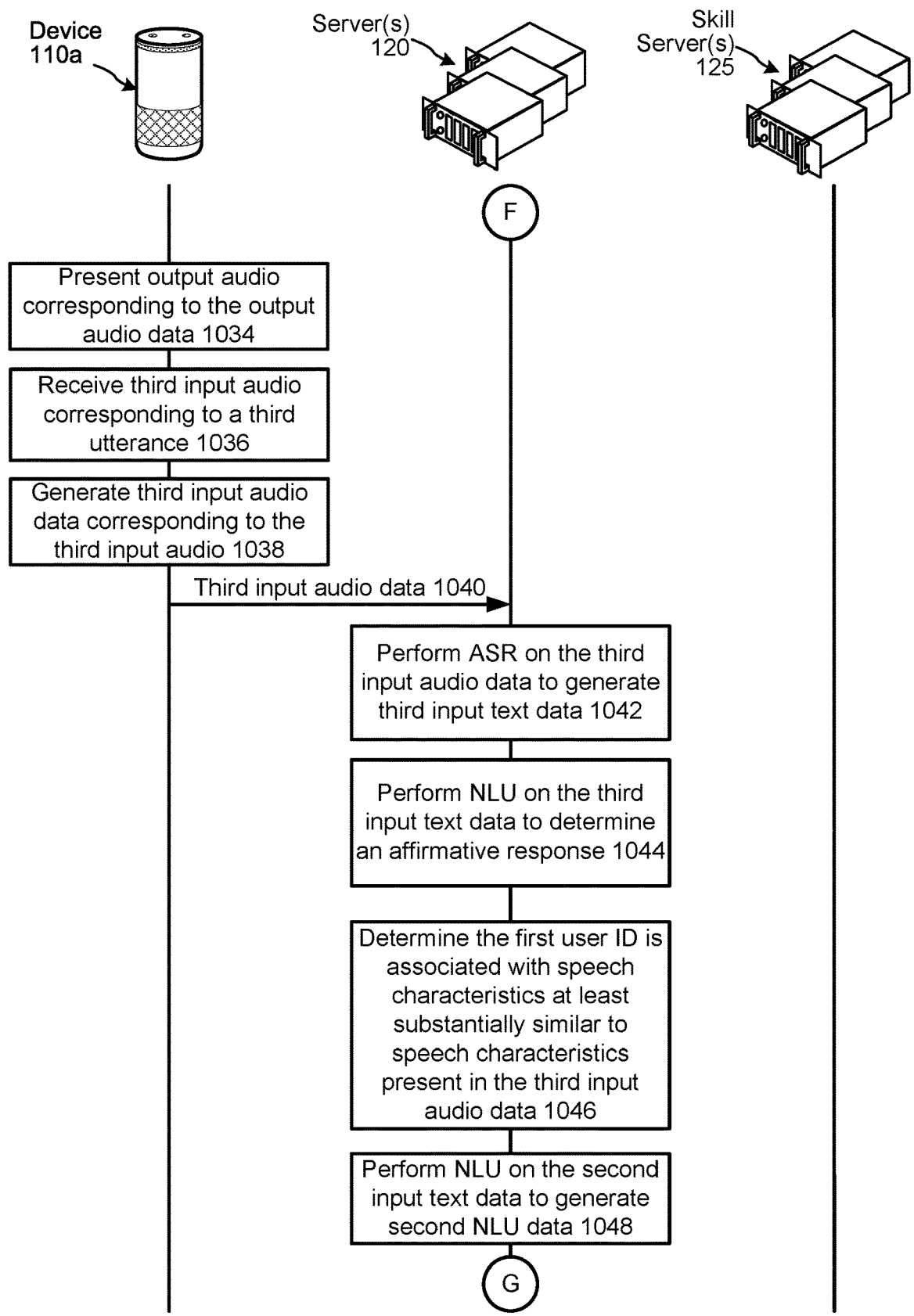

FIGS. 9A and 9B illustrate the authentication of a child mode device and the processing of a child mode device command. During an initial setup of the device 110a, the device sends (130) a request to the server(s) 120 to authenticate the device 110a with the server(s) 120. The server(s) 120 authenticates (132) the device 110a, determines (134) the device 110a should be configured for child mode, and associates (902) a device ID of the device 110a with a child device indicator in a device account preference storage (or the user profile storage 370).

After initial setup, the device 110a may receive (904) input audio corresponding to an utterance. The device 110a may generate (906) input audio data corresponding to the input audio and send (908) the input audio data to the server(s) 120.

The server(s) 120 determines (912) the device account preference storage (or the user profile storage 370) indicates the device ID of the device 110a is associated with a child device indicator. Once the server(s) 120 determines the device 110a is associated with a child device indicator, specific system rules may be enforced. For example, the system may implement access control rules that prevent commands received from the device 110a that correspond to requests to control other devices (e.g., garage doors, front doors of houses, appliances such as stoves, etc.) from being executed by the system. For further example, the system may generate first NLU results for a command when the device is not associated with a child device indicator and second NLU results for the command when the device is associated with a child device indicator. Output content may also be limited by device ID and/or whether child mode is activated with respect to the device 110a.

The server(s) 120 also performs (910) ASR on the input audio data to generate input text data. Based at least in part on the child device indicator, the server(s) 120 performs (914) NLU on the input text data to generate an N-best list of intents. The N-best list of intents may include (916) only intents that may be processed by "child safe" speechlets. Alternatively, the N-best list of intents may include (916) intents that may be processed by "child safe" as well as non-child safe speechlets. If the N-best list of intents includes child safe and non-child safe speechlets, the N-best list may be accompanied by metadata indicating the user is a child. The metadata may be used by a speechlet to ensure that content output is child safe. For example, a child user may be permitted to access a music streaming service that includes explicit lyrics. The speechlet associated with the music streaming service may use the metadata to ensure music output to the user does not include explicit lyrics. For further example, a child user may be permitted to access a smart home speechlet. When the metatdata indicates the user is a child, the metatdata may prevent the speechlet from executing non-child safe commands (e.g., opening doors, turning on appliances such as ovens) but may not prevent the speechlet from executing child safe commands (e.g., turning on lights).

Instead of limiting NLU processing to only child safe speechlets, the system may perform NLU with respect to all speechlets. The system may then use the fact that a given speechlet is child safe to affect the NLU confidence score associated with the speechlet. For example, an NLU confidence score associated with a child safe speechlet may be increased while an NLU confidence score associate with a non-child-safe speechlet may be decreased. The other data 791 may include information indicating speechlets that are child safe.

The server(s) 120 also determines (918) a speechlet that is most appropriate for executing the intent of the input command based at least in part on the child device indicator. For example, if the N-best list of intents includes intents that may be executed by child safe as well as non-child safe speechlets, the server(s) 120 may determine a child safe speechlet that is likely to provide the most relevant response to the user command since the device 110*a* is associated with a child device indicator.

If the server(s) 120 determines a speechlet 390 is the best source for a response to the user command, the server(s) 120 causes (920) the speechlet 390 to determine output data based at least in part on NLU data and an intent indicator. The NLU data may include the input text data (or a portion thereof) tagged with respect to the speechlet 390. The intent indicator may represent an intent that the speechlet 390 may execute with respect to the NLU data to determine appropriate output data. For example, a music speechlet 390 may use NLU data corresponding to Artist: Adele and Song: Water Under the Bridge, and an intent indicator corresponding to <PlayMusic> to determine output audio data corresponding to Adele's song Water Under the Bridge.

If the server(s) 120 determines a skill is the best source for a response to the user command, the server(s) 120 sends (922) NLU data and an intent indicator to a skill server(s) 125 associated with the determined skill. The skill server(s) 125 determines (924) output data based at least in part on the NLU data and the intent indicator, and sends (926) the output data to the server(s) 120.

If the output data (determined by the speechlet 390 or the skill server(s) 125) is text data and the system determines content should be output to the user as audio, the server(s) 120 performs (928) TTS on the output data to generate output audio data. The server(s) 120 then sends (930) the output audio data to the device 110*a*, which presents (932) output audio corresponding to the output audio data.

As described above, determining the device 110*a* is associated with a child device indicator may cause the system to execute in a child mode with respect to the device 110*a*. Determining the device 110*a* is associated with a child device indicator may also cause the system to execute in a child mode with respect to other devices proximate the device 110*a*. For example, the device 110*a* may be located in a room of a house in conjunction with another system device. Determining the device 110*a* is associated with a child device indicator may cause the system to execute in a child mode with respect to the other system device in the room of the house.

Multiple users may engage the system in multiple consecutive dialogs. For example, a first user may say "Alexa, play my top pop music." The system may determine the user that spoke the command, determine the user's top pop music, and cause a user device(s) to present the top pop music. A second user may then say "Alexa, book me a ride to Main Street." The system may be unable to determine an identity of the second user, for example if the second user is a guest of the household in which the user device is located. Based on this, the system may determine the identity of the first user associated with the first command and may output computerized speech corresponding to "[First user name] can I book the ride," for example. The first user may then say "Yes" or some other confirmatory statement. The system may confirm that the user (i.e., the first user) that confirmed it was ok to book the ride is the same user that spoke the first command. If the system is able to confirm such, the system may determine the first user's ride sharing account and use it to book a ride to Main Street.

FIGS. 10A through 10E illustrate the use of a previous user ID with respect to processing of a current command. The device 110*a* receives (904) first input audio corresponding to a first utterance. The device 110*a* generates (906) first input audio data corresponding to the first input audio and sends (908) the first input audio data to the server(s) 120.

The server(s) 120 performs (910) ASR on the first input audio data to generate first input text data. The server(s) 120 also determines (1002) a first user ID associated with stored speech characteristics at least substantially similar to speech characteristics present in the first input audio data. For example, the server(s) 120 may determine the speech characteristics in the first input audio data correspond to stored speech characteristic data associated with a user profile. The user profile may be associated with the first user ID and a user having an age of eighteen years or less. The server(s) 120 may also determine (1003) whether the user is a child based on speech characteristics present in the first input audio data. For example, the server(s) 120 may determine, using a trained model(s), that the speech characteristics in the first input audio data are similar to speech characteristics of individuals having an age of eighteen or less. Based at least in part thereon, the server(s) 120 may associate (1004) the device ID of the device 110*a* with an indicator corresponding to a child-friendly operating mode. The server(s) 120 may configure the device ID to be associated with the indicator for a predetermined length of time (e.g., a length of time that it is likely a child user will interact with the device 110*a*).

The server(s) 120 also performs (1005) NLU on the first input text data to generate first NLU data. Based on the device ID being associated with the child-friendly operating mode, the server(s) 120 may perform NLU with respect to only a subset of the system's speechlets (i.e., speechlets that provide child safe content). The server(s) 120 may cause (1006) a speechlet(s) 390 to determine first output data based at least in part on the first NLU data and an indication of the first user ID. Alternatively, the server(s) 120 may send (1008) the first NLU data and the indication of the first user ID to a skill server(s) 125. The skill server(s) 125 may determine (1010) first output data based at least in part on the first NLU data and the indication of the first user ID. The skill server(s) 125 then sends (926) the first output data to the server(s) 120. The server(s) 120 may send (1012) the first output data to the device 110*a* and the device 110*a* may present (1014) first content corresponding to the first output data.

At some point while or after the device 110*a* presents the first content, the device 110*a* may receive (1016) second input audio corresponding to a second utterance. The device 110*a* may generate (1018) second input audio data corresponding to the second input audio and send (1020) the second input audio data to the server(s) 120.

The server(s) 120 performs (1022) ASR on the second input audio data to generate second input text data. The server(s) 120 may determine (1024) the second input audio data is not associated with the first user ID and/or device ID. For example, the server(s) 120 may fail to determine a user ID of the system associated with stored speech characteristics at least substantially similar to speech characteristics present in the second input audio data. For example, the system may store speech characteristics associated with user IDs associated with a household ID and the second input audio may have been spoken by a guest of the household.

Nonetheless, the server(s) 120 may determine the speaker of the second input audio is a child based on speech characteristics present in the second input audio data. The server(s) 120 may also determine that speech characteristics in the second input audio data correspond to stored speech characteristic data associated with a second user ID. The server(s) 120 may also determine (1025) the device ID of the device 110a is associated with the indicator corresponding to the child-friendly operating mode. For example, if the server(s) 120 configures the device ID to only be associated with the indicator for a predetermined length of time, determining the device ID is associated with the indicator may simply involve the server(s) 120 determining a time receipt of the second input audio data is within the predetermined length of time. Based at least in part on determining the second input audio data is not associated with the first user ID and/or determining the device ID is associated with the child-friendly mode, the server(s) 120 determines (1026) the first output data was associated with the first user ID and generates (1028) output text data soliciting whether the first user ID may be used to respond to the second utterance. The server(s) 120 may determine that the second utterance requests output that is inappropriate for a child (e.g., an individual under at least eighteen years of age). If so, the output text data may at least partially include an indication that the system cannot execute the command associated with the second utterance based on the device 110a being associated with the child operating mode. The server(s) 120 may perform (1030) TTS on the output text data to generate output audio data and may send (1032) the output audio data to the device 110a.

The device 110a presents (1034) output audio corresponding to the output audio data and receives (1036) third input audio corresponding to a third utterance. The device 110a generates (1038) third input audio data corresponding to the third input audio and sends (1040) the third input audio data to the server(s) 120.

The server(s) 120 performs (1042) ASR on the third input audio data to generate third input text data. The server(s) 120 also performs (1044) NLU on the third input text data to determine an affirmative response (i.e., an indication that it is ok to use the first user ID to response to the second utterance). In order to ensure the user that spoke the third audio has the authority to permit the system to associate the first user ID with the second input audio data, the server(s) 120 may use user recognition techniques described herein to determine (1046) the first user ID is associated with stored speech characteristic data at least substantially similar to speech characteristics present in the third input audio data. The server(s) 120 performs (1048) NLU on the second input text data to generate second NLU data. The server(s) 120 may perform NLU on the second input text data with respect to only a subset of the system's speechlets (i.e., speechlets that provide child safe content).

The server(s) 120 may cause (1050) a speechlet(s) 390 to determine second output data based at least in part on the second NLU data and an indication of the first user ID. Alternatively, the server(s) 120 may send (1052) the second NLU data and the indication of the first user ID to a skill server(s) 125. The skill server(s) 125 may determine (1054) second output data based at least in part on the second NLU data and the indication of the first user ID. The skill server(s) 125 then sends (1056) the second output data to the server(s) 120. The second output data may be received from the same or a different speechlet/skill server(s) 125 as the first output data. The server(s) 120 may send (1058) the second output data to the device 110a and the device 110a may present (1060) second content corresponding to the second output data.

At some point, the server(s) 120 may generate output text data soliciting whether the first user ID should no longer be associated with the device 110a. That is, the server(s) 120 may generate output text data requesting whether the device 110a should no longer be associated with the child operating mode. The server(s) 120 may perform TTS on the output text data to generate output audio data. The server(s) 120 may then send the output audio data to the device 110a for presentment.

FIGS. 11A through 11C are a signal flow diagram illustrating the use of multiple user IDs with respect to processing of a single dialog session. The device 110a receives (904) first input audio corresponding to a first utterance. The device 110a generates (906) first input audio data corresponding to the first input audio and sends (908) the first input audio data to the server(s) 120.

The server(s) 120 determines (1002) a first user ID associated with stored speech characteristics at least substantially similar to speech characteristics present in the first input audio data. The server(s) 120 also performs (910) ASR on the first input audio data to generate first input text data and performs (1005) NLU on the first input text data to generate first NLU data. The server(s) 120 may perform NLU on the first input text data with respect to only a subset of the system's speechlets (i.e., speechlets that provide child safe content). The server(s) 120 also establishes (1102) a dialog session with a speechlet(s) 390 and/or skill server(s) 125 that is associated with the first NLU data (e.g., that may provide content responsive to the first NLU data).

The server(s) 120 may cause (1006) the speechlet(s) 390 to determine first output data based at least in part on the first NLU data and an indication of the first user ID. Alternatively, the server(s) 120 may send (1008) the first NLU data and the indication of the first user ID to the skill server(s) 125. The skill server(s) 125 may determine (1010) first output data based at least in part on the first NLU data and the indication of the first user ID. The skill server(s) 125 then sends (926) the first output data to the server(s) 120. The server(s) 120 may send (1012) the first output data to the device 110a and the device 110a may present (1014) first content corresponding to the first output data.

At some point while or after the device 110a presents the first content, the device 110a may receive (1016) second input audio corresponding to a second utterance. The device 110a may generate (1018) second input audio data corresponding to the second input audio and send (1020) the second input audio data to the server(s) 120.

The server(s) 120 performs (1022) ASR on the second input audio data to generate second input text data and performs (1048) NLU on the second input text data to generate second NLU data.

The server(s) 120 may determine (1104) the second NLU data corresponds to the dialog session. Alternatively, the server(s) 120 may determine the second input audio data or pre-NLU second input text data corresponds to the dialog session, thereby allowing the server(s) 120 to limit NLU processing to being performed only with respect to the speechlet(s) 390 and/or skill server(s) 125 associated with the dialog session. The server(s) 120 may determine the second input audio data or pre-NLU second input text data corresponds to the dialog session based on the second input audio data or pre-NLU second input text data not including a representation of a wakeword.

The server(s) 120 determines (1106) a second user ID associated with stored speech characteristics at least substantially similar to speech characteristics present in the second input audio data. The server(s) 120 may then cause (1108) the speechlet(s) 390 associated with the dialog session to determine second output data based at least in part on the second NLU data and an indication of the second user ID. Alternatively, the server(s) 120 may send (1110) the second NLU data and the indication of the second user ID to a skill server(s) 125 associated with the dialog session. The skill server(s) 125 may determine (1112) second output data based at least in part on the second NLU data and the indication of the second user ID. The skill server(s) 125 then sends (1056) the second output data to the server(s) 120. The server(s) 120 may send (1058) the second output data to the device 110a and the device 110a may present (1060) second content corresponding to the second output data.

Figure 12:
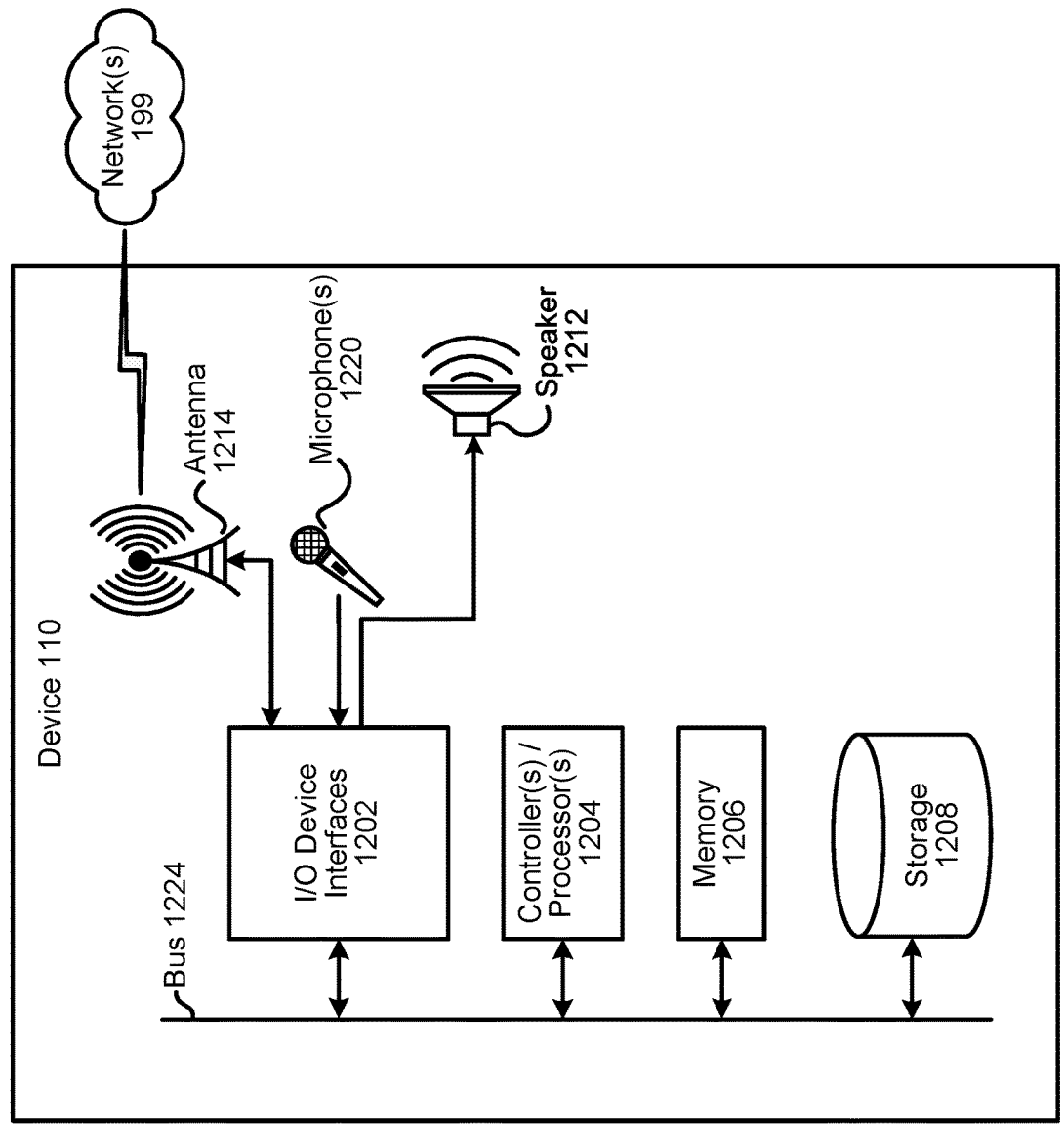
FIG. 12 is a block diagram conceptually illustrating example components of a device according to embodiments of the present disclosure.
Figure 13:
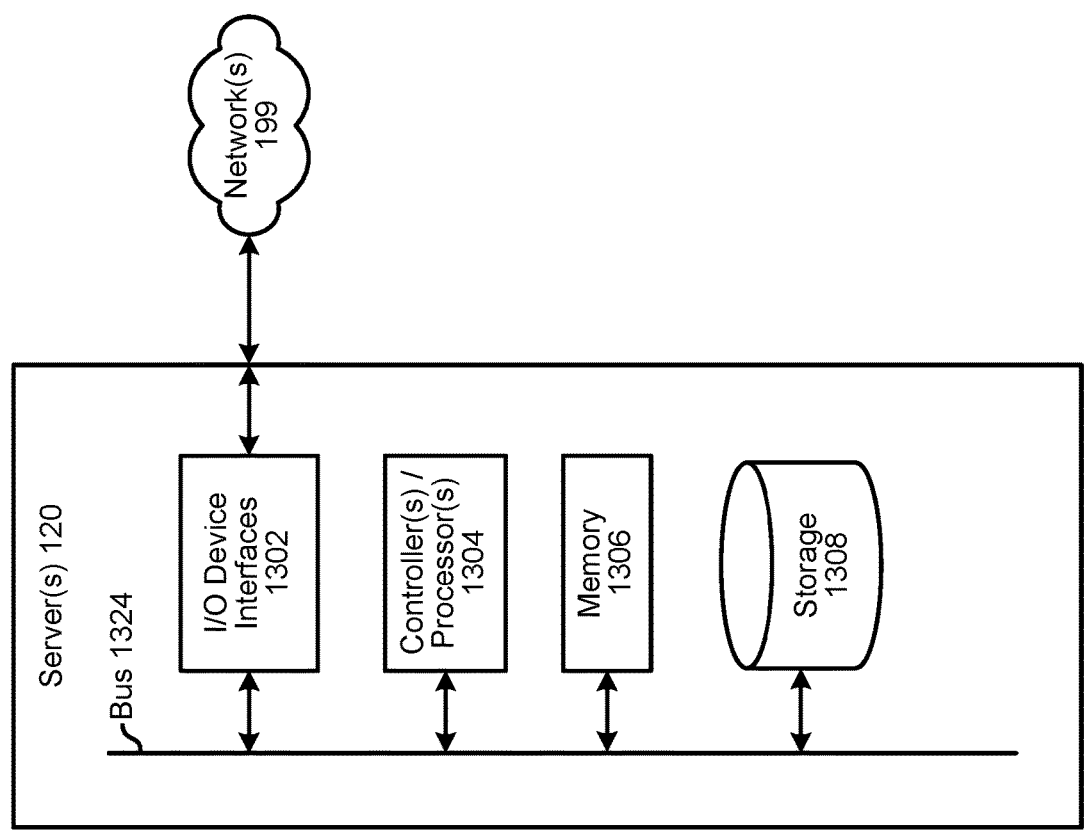
FIG. 13 is a block diagram conceptually illustrating example components of a server according to embodiments of the present disclosure.

FIG. 12 is a block diagram conceptually illustrating a user device 110 that may be used with the system. FIG. 13 is a block diagram conceptually illustrating example components of a remote device, such as the server(s) 120, which may assist with ASR processing, NLU processing, or command processing. Multiple servers 120 may be included in the system, such as one server 120 for performing ASR, one server 120 for performing NLU, etc. In operation, each of these devices (or groups of devices) may include computer-readable and computer-executable instructions that reside on the respective device (110/120), as will be discussed further below.

Each of these devices (110/120) may include one or more controllers/processors (1204/1304), which may each include a central processing unit (CPU) for processing data and computer-readable instructions, and a memory (1206/1306) for storing data and instructions of the respective device. The memories (1206/1306) may individually include volatile random access memory (RAM), non-volatile read only memory (ROM), non-volatile magnetoresistive memory (MRAM), and/or other types of memory. Each device (110/120) may also include a data storage component (1208/1308) for storing data and controller/processor-executable instructions. Each data storage component (1208/1308) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (1202/1302).

Computer instructions for operating each device (110/120) and its various components may be executed by the respective device's controller(s)/processor(s) (1204/1304), using the memory (1206/1306) as temporary "working" storage at runtime. A device's computer instructions may be stored in a non-transitory manner in non-volatile memory (1206/1306), storage (1208/1308), or an external device(s). Alternatively, some or all of the executable instructions may be embedded in hardware or firmware on the respective device in addition to or instead of software.

Each device (110/120) includes input/output device interfaces (1202/1302). A variety of components may be connected through the input/output device interfaces (1202/1302), as will be discussed further below. Additionally, each device (110/120) may include an address/data bus (1224/1324) for conveying data among components of the respective device. Each component within a device (110/120) may also be directly connected to other components in addition to (or instead of) being connected to other components across the bus (1224/1324).

Referring to FIG. 12, the device 110 may include input/output device interfaces 1202 that connect to a variety of components such as an audio output component such as a speaker 1212, a wired headset or a wireless headset (not illustrated), or other component capable of outputting audio. The device 110 may also include an audio capture component. The audio capture component may be, for example, a microphone 1220 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may also include a camera, display, touchscreen, buttons, and/or other not-illustrated input device.

Via antenna(s) 1214, the input/output device interfaces 1202 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system 100 may be distributed across a networked environment. The I/O device interface (1202/1302) may also include communication components that allow data to be exchanged between devices such as different physical servers in a collection of servers or other components.

The components of the device(s) 110 and the server(s) 120 may include their own dedicated processors, memory, and/or storage. Alternatively, one or more of the components of the device(s) 110 and the server(s) 120 may utilize the I/O interfaces (1202/1302), processor(s) (1204/1304), memory (1206/1306), and/or storage (1208/1308) of the device(s) 110 and server(s) 120, respectively. Thus, the ASR component 350 may have its own I/O interface(s), processor(s), memory, and/or storage; the NLU component 360 may have its own I/O interface(s), processor(s), memory, and/or storage; and so forth for the various components discussed herein.

The computer-readable media/memory (1206/1306) can include non-transitory computer-readable storage media, which can include hard drives, floppy diskettes, optical discs, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media can include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

In some implementations, the processor(s) (1204/1304) may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) (1204/1304) may possess its own local memory, which also may store program modules, program data, and/or one or more operating systems.

The computer-readable media/memory (1206/1306) may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media/memory (1206/1306) may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Several modules such as instruction, data stores, and so forth may be stored within the computer-readable media/memory (1206/1306) and configured to execute on the processor(s).

As noted above, multiple devices may be employed in a single system. In such a multi-device system, each of the devices may include different components for performing different aspects of the system's processing. The multiple devices may include overlapping components. The components of the device 110 and the server(s) 120, as described herein, are exemplary, and may be located as a stand-alone device or may be included, in whole or in part, as a component of a larger device or system.

Figure 14:
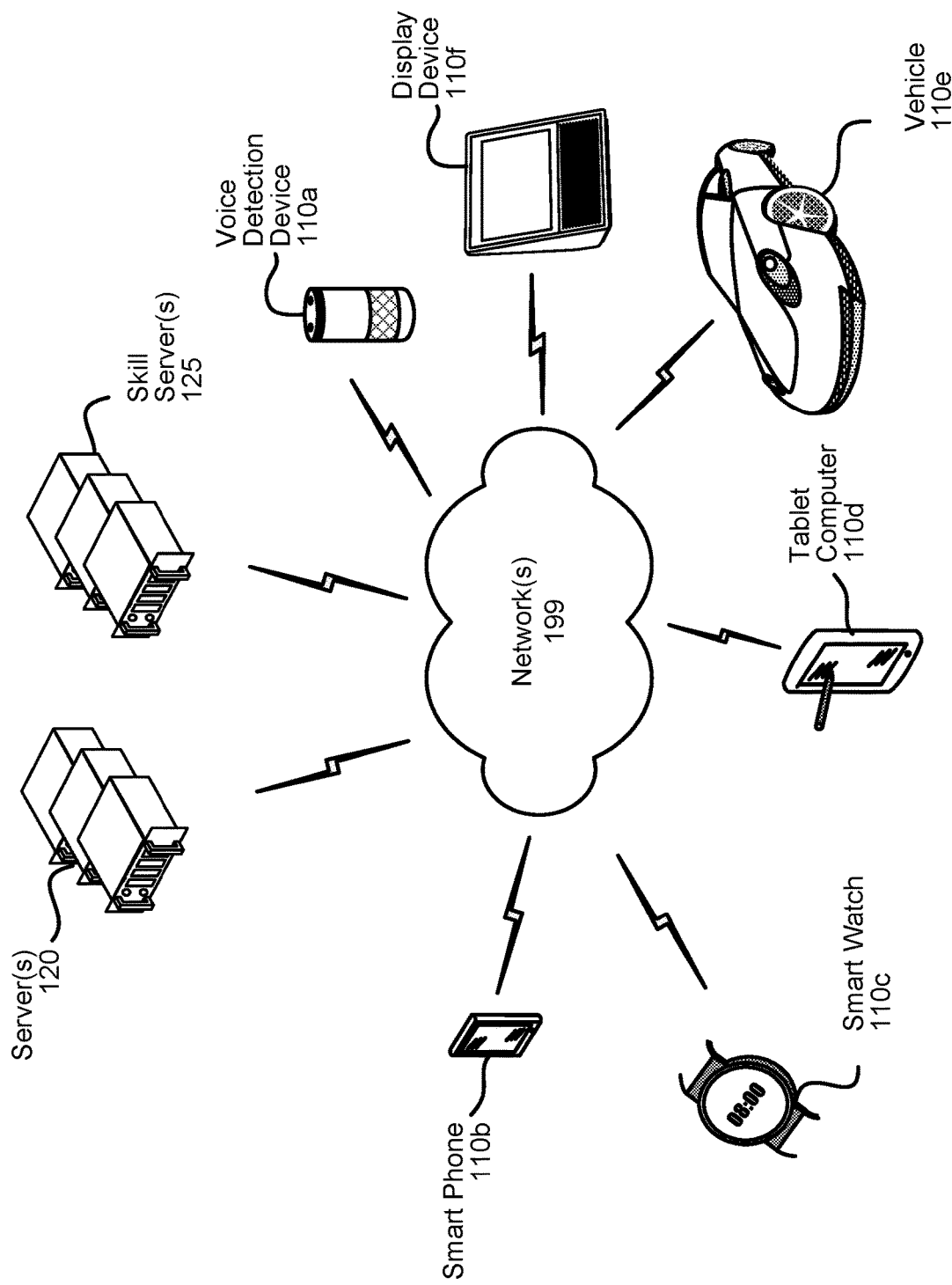
FIG. 14 illustrates an example of a computer network for use with the speech processing system.

As shown in FIG. 14, the system may be configured with various networked devices 110 that may perform some or all of the processed described herein. The device 110 may be implemented as a voice detection device 110a, a smart phone 110b, a smart watch 110c, a tablet computer 110d, a vehicle 110e, and/or a display device 110f. The network(s) 199 may include a local or private network or may include a wide network such as the Internet. Devices may be connected to the network(s) 199 through either wired or wireless connections. The devices may be connected to the network(s) 199 through a wireless service provider, over a WiFi or cellular network connection, or the like. Other devices are included as network-connected support devices, such as the server(s) 120, the skill server(s) 125, or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 350, the NLU component 360, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
   receiving, from a device, first input audio data corresponding to a first utterance;
   associating the first input audio data with a dialog session identifier (ID);
   determining first user profile data associated with the first input audio data;
   determining first results data based at least in part on the first input audio data;
   associating the first results data with the dialog session ID;
   generating first output data based at least in part on the first results data and the first user profile data;
   sending, to the device, the first output data;
   receiving, from the device, second input audio data corresponding to a second utterance;
   determining second results data based at least in part on the second input audio data;
   determining second user profile data associated with the second input audio data;
   generating second output data based at least in part on the second results data and the second user profile data; and
   sending, to the device, the second output data.

2. The computer-implemented method of claim 1, further comprising:
   performing speech processing using the first input audio data to determine the first results data.

3. The computer-implemented method of claim 1, further comprising:
   determining the second utterance relates to the first utterance; and
   associating the second input audio data with the dialog session ID.

4. The computer-implemented method of claim 1, further comprising:
   determining the second utterance relates to the first utterance,
   wherein determining the second results data is further based at least in part on the first results data.

5. The computer-implemented method of claim 1, further comprising:
   determining at least a first portion of the first results data includes restricted content; and
   determining, based at least in part on the first user profile data, that restricted content is not to be output in response to the first utterance,
   wherein the first output data does not include the first portion.

6. The computer-implemented method of claim 5, wherein the first output data includes an indication that the first utterance corresponds to restricted content.

7. The computer-implemented method of claim 5, further comprising:
   determining the second utterance corresponds to an indication to output the first portion;
   determining, based at least in part on the second user profile data, that restricted content is permitted to be output in response to the second utterance; and
   causing the first portion to be output.

8. The computer-implemented method of claim 1, further comprising:
   determining audio characteristic data corresponding to the first input audio data,
   wherein determining the first user profile data is associated with the first input audio data is based at least in part on the audio characteristic data.

9. The computer-implemented method of claim 1, wherein determining the first user profile data is based at least in part on a device identifier associated with the device.

10. The computer-implemented method of claim 9, further comprising:
    determining audio characteristic data corresponding to the second input audio data,
    wherein determining the second user profile data is associated with the second input audio data is based at least in part on the audio characteristic data.

11. A system, comprising:
    at least one processor; and
    at least one memory comprising instructions that, when executed by the at least one processor, cause the system to:
    receive, from a device, first input audio data corresponding to a first utterance;
    associate the first input audio data with a dialog session identifier (ID);
    determine first user profile data associated with the first input audio data;
    determine first results data based at least in part on the first input audio data;
    associate the first results data with the dialog session ID;
    generate first output data based at least in part on the first results data and the fir user profile data;
    send, to the device, the first output data;
    receive, from the device, second input audio data corresponding to a second utterance;
    determine second results data based at least in part on the second input audio data;
    determine second user profile data associated with the second input audio data;
    generate second output data based at least in part on the second results data and the second user profile data; and
    send, to the device, the second output data.

12. The system of claim 11, wherein the at least one memory further comprises instructions that, when executed by the at least one processor, further cause the system to:
    perform speech processing using the first input audio data to determine the first results data.

13. The system of claim 11, wherein the at least one memory further comprises instructions that, when executed by the at least one processor, further cause the system to:
    determine the second utterance relates to the first utterance; and
    associate the second input audio data with the dialog session ID.

14. The system of claim 11, wherein the at least one memory further comprises instructions that, when executed by the at least one processor, further cause the system to:
    determine the second utterance relates to the first utterance,
    wherein determination of the second results data is further based at least in part on the first results data.

15. The system of claim 11, wherein the at least one memory further comprises instructions that, when executed by the at least one processor, further cause the system to:
    determine at least a first portion of the first results data includes restricted content; and determine, based at least in part on the first user profile data, that restricted content is not to be output in response to the first utterance, wherein the first output data does not include the first portion.

16. The system of claim 15, wherein the first output data includes an indication that the first utterance corresponds to restricted content.

17. The system of claim 15, wherein the at least one memory further comprises instructions that, when executed by the at least one processor, further cause the system to:

determine the second utterance corresponds to an indication to output the first portion;

determine, based at least in part on the second user profile data, that restricted content is permitted to be output in response to the second utterance; and cause the first portion to be output.

18. The system of claim 11, wherein the at least one memory further comprises instructions that, when executed by the at least one processor, further cause the system to:

determine audio characteristic data corresponding to the first input audio data, wherein determination of the first user profile data is associated with the first input audio data is based at least in part on the audio characteristic data.

19. The system of claim 11, wherein determination of the first user profile data is based at least in part on a device identifier associated with the device.

20. The system of claim 19, wherein the at least one memory further comprises instructions that, when executed by the at least one processor, further cause the system to:

determine audio characteristic data corresponding to the second input audio data, wherein determination of the second user profile data is associated with the second input audio data is based at least in part on the audio characteristic data.

* * * * *